(12) United States Patent
Uemura et al.

(10) Patent No.: US 11,460,829 B2
(45) Date of Patent: Oct. 4, 2022

(54) MANAGEMENT APPARATUS AND NON-TRANSITORY COMPUTER READABLE MEDIUM

(71) Applicant: FUJIFILM BUSINESS INNOVATION CORP., Tokyo (JP)

(72) Inventors: Yasushi Uemura, Kanagawa (JP); Ryosuke Higashikata, Kanagawa (JP); Atsushi Ogihara, Kanagawa (JP); Tomonari Takahashi, Kanagawa (JP); Shigeyuki Sakaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/985,653

(22) Filed: Aug. 5, 2020

(65) Prior Publication Data

US 2021/0240158 A1   Aug. 5, 2021

(30) Foreign Application Priority Data

Jan. 31, 2020   (JP) .............................. JP2020-015796

(51) Int. Cl.
*G05B 19/4097* (2006.01)

(52) U.S. Cl.
CPC .................... *G05B 19/4097* (2013.01); *G05B 2219/35005* (2013.01); *G05B 2219/45234* (2013.01)

(58) Field of Classification Search
CPC ...... G05B 19/4097; G05B 2219/35005; G05B 2219/45234
See application file for complete search history.

(56) References Cited

U.S. PATENT DOCUMENTS

| 6,490,498 | B1 | 12/2002 | Takagi | |
|---|---|---|---|---|
| 6,885,367 | B1* | 4/2005 | Fujieda | G06T 19/00 345/420 |
| 11,010,531 | B2* | 5/2021 | Cho | G06F 30/394 |
| 2008/0015719 | A1* | 1/2008 | Ziolek | G06F 30/20 700/97 |
| 2016/0350335 | A1* | 12/2016 | Rorato | G06F 16/532 |

(Continued)

FOREIGN PATENT DOCUMENTS

| JP | H6-215105 A | 8/1994 |
|---|---|---|
| JP | 2001-219341 A | 8/2001 |

(Continued)

*Primary Examiner* — Thomas C Lee
*Assistant Examiner* — Ameir Myers
(74) *Attorney, Agent, or Firm* — Oliff PLC

(57) ABSTRACT

A management apparatus includes a processor configured to: autonomously collect, even without an instruction from a user, attribute data concerning attributes of a product defined by a three-dimensional shape, in accordance with a collection rule for collecting the attribute data concerning the product, the attribute data being generated in individual process stages before the product is manufactured; associate the collected attribute data with three-dimensional shape data indicating the three-dimensional shape of the product, as attributes of the three-dimensional shape data, in accordance with a superimposition rule which defines association between the three-dimensional shape data and the attribute data concerning the product; and manage the three-dimensional shape data and the attributes of the product.

27 Claims, 19 Drawing Sheets

(56) References Cited

U.S. PATENT DOCUMENTS

| | | | | |
|---|---|---|---|---|
| 2018/0260501 A1* | 9/2018 | Dweik | ................... | G06N 20/00 |
| 2020/0001536 A1* | 1/2020 | DeSimone | .............. | B29C 64/35 |
| 2020/0183358 A1* | 6/2020 | Wolf | ................. | G05B 19/4099 |
| 2020/0250894 A1* | 8/2020 | Mehr | ................... | G06N 3/0445 |
| 2020/0333772 A1* | 10/2020 | Srivastava | ......... | G05B 13/0265 |
| 2021/0042313 A1* | 2/2021 | Pillarisetty | ............. | G06N 5/046 |
| 2021/0182278 A1* | 6/2021 | Kaede | ................... | G06Q 10/00 |

FOREIGN PATENT DOCUMENTS

| | | |
|---|---|---|
| JP | 2003-196326 A | 7/2003 |
| JP | 3940834 B2 | 7/2007 |
| JP | 2008-299489 A | 12/2008 |

\* cited by examiner

FIG. 20

| DATA POINT BEFORE ADJUSTMENT OF RESOLUTION | DATA POINT AFTER ADJUSTMENT OF RESOLUTION |
|---|---|
| V1, V2, V3, V4 | V1 |
| V1, V2, V3, V4 | V2 |
| V1, V2, V3, V4 | V3 |
| V1, V2, V3, V4 | V4 |
| ⋮ | ⋮ |

FIG. 21

| DATA POINT BEFORE ADJUSTMENT OF RESOLUTION | DATA POINT AFTER ADJUSTMENT OF RESOLUTION |
|---|---|
| V1, V2, V3, V4, V5, V6, V7 | V1 |
| V9, V10, V11, V12, V13, V14, V15 | V2 |
| V17, V18, V19, V20, V21, V22, V23 | V3 |
| V25, V26, V27, V28, V29, V30, V31 | V4 |
| ⋮ | ⋮ |

|  | FIRST SEARCH CONDITION | SECOND SEARCH CONDITION | THIRD SEARCH CONDITION |
|---|---|---|---|
| SEARCH OBJECT | CAD DATA | STRUCTURAL ANALYSIS DATA | FEATURE EXTRACTION DATA |
| RANGE | REPRESENTATIVE ATTRIBUTE DATA SHOWS THAT SIMILARITY IS 60% OR HIGHER. | MAXIMUM DISPLACEMENT IN RESPONSE TO STRESS IS ±1 mm OR GREATER. | PORTIONS HAVING HIGH DANGER LEVEL OF WOBBLE OR WARPAGE ARE ZERO. |

FIG. 28

| INTEGRATED DATA ID | FIRST SEARCH RESULT | SECOND SEARCH RESULT | THIRD SEARCH RESULT |
|---|---|---|---|
| 05 | 72% | 1.1 mm | 0 PORTIONS |
| 23 | 65.2% | 1.0 mm | 0 PORTIONS |
| 16 | 64.8% | 3.1 mm | 0 PORTIONS |
| 04 | 60% | 1.2 mm | TWO PORTIONS |
| 03 | 70% | 0.9 mm | 0 PORTIONS |
| 11 | 60.2% | 0.03 mm | 0 PORTIONS |
| 09 | 71.1% | 0.7 mm | ONE PORTION |

FIG. 29

| INTEGRATED DATA ID | FIRST SEARCH RESULT | SECOND SEARCH RESULT | THIRD SEARCH RESULT |
|---|---|---|---|
| 12 | 60.3% | — | 0 PORTIONS |
| 29 | 62.2% | 1.2 mm | — |
| 08 | 70.2% | 0.98 mm | — |

FIG. 30

| INTEGRATED DATA ID | FIRST SEARCH RESULT | SECOND SEARCH RESULT | THIRD SEARCH RESULT |
|---|---|---|---|
| 05 | 72% | 1.1 mm | 0 PORTIONS |
| 23 | 65.2% | 1.0 mm | 0 PORTIONS |
| 16 | 64.8% | 3.1 mm | 0 PORTIONS |
| 04 | 60% | 1.2 mm | TWO PORTIONS |
| 03 | 70% | 0.9 mm | 0 PORTIONS |
| 11 | 60.2% | 0.03 mm | 0 PORTIONS |
| 09 | 71.1% | 0.7 mm | ONE PORTION |

FIG. 31

| INTEGRATED DATA ID | FIRST SEARCH RESULT | SECOND SEARCH RESULT | THIRD SEARCH RESULT |
|---|---|---|---|
| 12 | 60.3% | — | 0 PORTIONS |
| 29 | 62.2% | 1.2 mm | — |
| 08 | 70.2% | 0.98 mm | — |

FIG. 32

| INTEGRATED DATA ID | FIRST SEARCH RESULT | SECOND SEARCH RESULT | THIRD SEARCH RESULT |
|---|---|---|---|
| 05 | 72% | 1.1 mm | 0 PORTIONS |
| 23 | 65.2% | 1.0 mm | 0 PORTIONS |
| 16 | 64.8% | 3.1 mm | 0 PORTIONS |
| 04 | 60% | 1.2 mm | TWO PORTIONS |
| 03 | 70% | 0.9 mm | 0 PORTIONS |
| 11 | 60.2% | 0.03 mm | 0 PORTIONS |
| 09 | 71.1% | 0.7 mm | ONE PORTION |

MANAGEMENT APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-015796 filed Jan. 31, 2020.

BACKGROUND

(i) Technical Field

The present disclosure relates to a management apparatus and a non-transitory computer readable medium.

(ii) Related Art

Japanese Unexamined Patent Application Publication No. 2001-219341 discloses the following integrated support system for sheet-metal working. The integrated support system manages sheet-metal working information including working information, which is control data for machine tools, and working support information related to the working information. Practical working information concerning practical working at a working site and unique attribute information used as a base for the practical working information are collected and are fed back to the sheet-metal working information.

Japanese Unexamined Patent Application Publication No. 2008-299489 discloses the following superimposition/correction CAD-CAM system. This CAD-CAM system includes a computer-aided manufacturing (CAM) system, a measurement system, and a detailed partial shape processor. The CAM system does die machining by using a metalworking machine based on machine numerical control (NC) data. The measurement system measures a correcting portion of a die subjected to machining and generates measurement point cloud data. The detailed partial shape processor generates detailed shape model data concerning the correcting portion, based on the measurement point cloud data. The CAM system includes a superimposition interface which superimposes the detailed shape model data on the machine NC data.

Japanese Unexamined Patent Application Publication No. 2003-196326 discloses the following shape model creating device. The shape model creating device includes a storage, a measured shape model creator, and a supplementer. The storage stores a reference shape model describing a reference shape of an object in a predetermined data format or data from which the reference shape model can be generated. The measured shape model creator determines three-dimensional (3D) shape information concerning an object produced based on the reference shape model and converts the 3D shape information into the predetermined data format so as to create a measured shape model. The supplementer supplements the measured shape model with the reference shape model so as to create a real shape model describing the shape of the produced object in the predetermined data format.

Japanese Unexamined Patent Application Publication No. H6-215105 discloses a three-dimensional image processing system. The three-dimensional image processing system includes an input unit, a storage, a search information input unit, a searcher, a creator, and a display controller. The input unit inputs 3D geometric shape information concerning an object and attribute information. The storage stores the 3D geometric shape information and the attribute information input by the input unit. The search information input unit inputs a search condition. The searcher searches the storage, based on the search condition input by the search information input unit. The creator creates a 2D projection image of the object from the 3D geometric shape information and the attribute information obtained as a search result by the searcher. The display controller performs control so that the 2D projection image created by the creator is displayed.

Japanese Patent No. 3940834 discloses the following analysis support computer-aided engineering (CAE) system. The analysis support CAE system includes a 3D CAD data generator, an analysis model generator, an analysis calculator, and an analysis result evaluator. The 3D CAD data generator generates 3D CAD data. The analysis model generator generates an analysis model for conducting numerical analysis. The analysis calculator conducts numerical analysis on the analysis model to generate a numerical analysis result. The analysis result evaluator visualizes the numerical analysis result in a format that is easy to be evaluated. The analysis support CAE system includes a database storing numerical map information data as digital data. The numerical map information data includes national spatial data concerning the natural environments including at least one of landform, altitude, geology, lakes, rivers, and vegetation, and national spatial data concerning the social environments including at least one of administrative divisions, land use, cultural properties, public facilities, housing, roads, railways, and land values, and at least one of land use zone boundaries and a population distribution. The analysis model generator includes a function of reading the numerical map information data from the database, converting the read numerical map information data into a data format that can be used for generating a 2D map which forms part of analysis data, and generating a 2D map within the computer. The analysis result evaluator includes a function of displaying the analysis result by superimposing at least the national spatial data concerning the social environments included in the numerical map information data on the analysis result.

SUMMARY

As the processing speed of computers is becoming faster and the storage amount of data is increasing, 3D design tools handling 3D data, such as 3D computer-aided design (CAD), 3D computer-aided engineering (CAE), 3D computer-aided testing (CAT), and 3D printers, are becoming widely used in manufacturing sites and for product designing.

If various items of data generated with 3D design tools in each process stage, such as a designing stage and an analyzing stage, before a product is manufactured, are managed by each process stage or each department separately, multiple items of data concerning the same product are managed in various locations in a distributed manner. With this management approach, if a user in a downstream process wishes to use data generated in an upstream process as a reference to carry out a task assigned to this user, it has to spend a lot of time and effort to find such data, which may lower the work efficiency. The following situation may also occur. A user in an upstream process has designed a product that satisfied the requirements specification after through much trial and error and provided data only concerning this product to a downstream process. In this case, a user in the downstream process is unable to examine the product from various points of view by using various items of data generated through much trial and error by the upstream process before the product was finally designed. There may also be a case in which a user in an upstream process wishes to design a product by using past data as a reference. With the above-described management approach, however, the user is unable to examine the product from various points of view by using various items of past data generated by the downstream process after through much trial and error.

Aspects of non-limiting embodiments of the present disclosure relate to providing a management apparatus and a non-transitory computer readable medium in which attributes of a product defined by a three-dimensional shape, which are generated in individual process stages before the product is manufactured are centrally managed so that a user in one process stage can make use of the attributes generated in the other process stages, unlike when such attributes are managed by individual stages independently.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a management apparatus including a processor configured to: autonomously collect, even without an instruction from a user, attribute data concerning attributes of a product defined by a three-dimensional shape, in accordance with a collection rule for collecting the attribute data concerning the product, the attribute data being generated in individual process stages before the product is manufactured; associate the collected attribute data with three-dimensional shape data indicating the three-dimensional shape of the product, as attributes of the three-dimensional shape data, in accordance with a superimposition rule which defines association between the three-dimensional shape data and the attribute data concerning the product; and manage the three-dimensional shape data and the attributes of the product.

BRIEF DESCRIPTION OF THE DRAWINGS

An exemplary embodiment of the present disclosure will be described in detail based on the following figures, wherein:

FIG. 20 is a table illustrating an example of the association between attribute data points before the adjustment of the resolution and those after the adjustment of the resolution;

FIG. 21 is a table illustrating another example of the association between attribute data points before the adjustment of the resolution and those after the adjustment of the resolution;

FIG. 28 is a table illustrating an example of a search result based on certain search conditions;

FIG. 29 is a table illustrating an example of reference information;

FIG. 30 is a table illustrating an output example of a search result based on certain search conditions;

FIG. 31 is a table illustrating an output example of reference information based on certain search conditions; and FIG. 32 is a table illustrating another output example of a search result based on certain search conditions.

DETAILED DESCRIPTION

Figure 1:
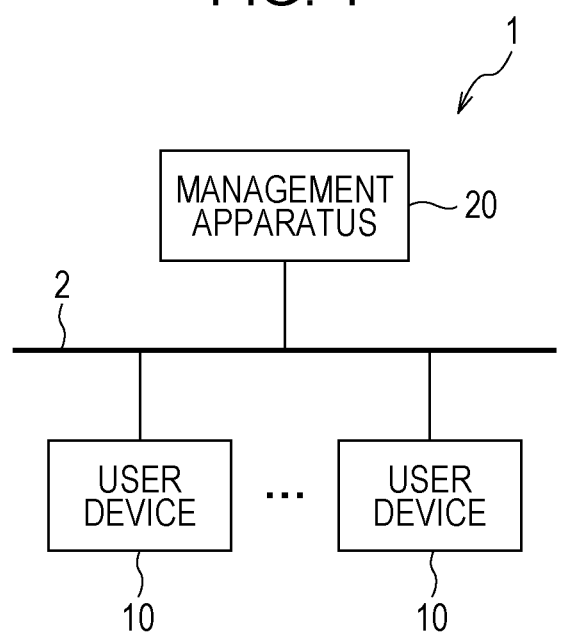
FIG. 1 is a block diagram illustrating an example of the configuration of a management system.

An exemplary embodiment of the disclosure will be described below with reference to the accompanying drawings. The same element will be designated by like reference numeral, and the same operation will be designated by like step number throughout the drawings, and an explanation thereof will not be repeated.

FIG. 1 is a block diagram illustrating an example of the configuration of a management system 1 that manages product information according to the exemplary embodiment. The management system 1 includes user devices 10 and a management apparatus 20. The user devices 10 and the management apparatus 20 are connected with each other via a communication network 2.

The communication network 2 may be a wired network, a wireless network, or a wired-and-wireless network. The communication network 2 may be a private network, such as an in-house local area network (LAN), or may alternatively be a public network, such as the internet, shared by many and unspecified users.

The user device 10 is used by a user assigned to a certain task in an individual process stage to design, evaluate, analyze, or manufacture a product, for example. The user device 10 may be any type of device if the device is used by a user for the above-described purpose. Examples of the user device 10 are a design tool for designing a product, an analysis tool for analyzing the characteristics of a designed product, such as a structural analysis tool, a manufacturing device for manufacturing a product in accordance with design data, such as an injection-molding machine and a three-dimensional (3D) printer, and a testing device for checking whether the dimensions and weight of a manufactured product satisfy the requirements specification. There is no limitation on the number of user devices 10 to be included in the management system 1.

There are various modes regarding a flow of a process from when a product is designed until when it is manufactured by using the management system 1. An example of a flow from when a product defined by a certain shape is designed until when it is manufactured will be discussed below.

A designer designs a product by using a design tool, such as a computer-aided design (CAD) tool, and generates CAD data concerning the designed product that satisfies the requirements specification. The designer then passes the CAD data to an evaluator who makes an evaluation from various points of view to check whether the product actually satisfies the requirements specification. The CAD data is an example of three-dimensional (3D) shape data indicating the 3D shape of a product. In the exemplary embodiment, 3D shape data will be simply called CAD data. However, 3D shape data is not limited to CAD data, and may be data indicating the 3D shape of a product in another format, such as polygon data, surface modeling data, and voxel data.

The evaluator analyzes the product indicated by the CAD data by using an analysis tool, such as a computer-aided engineering (CAE) tool. More specifically, the evaluator calculates a stress and distortion produced in each portion of the product and the strength of the product in response to the application of force. The evaluator then returns the analysis results to the designer.

If the analysis involving the manufacturing technology, such as, the flow of a material, such as a resin, a metal, and rubber, to be used when the product is manufactured by injection molding, the evaluator may request an engineer in a pre-manufacturing stage familiar with the manufacturing technology, to conduct analysis to check whether the product satisfies the manufacturing requirements, and receive analysis results from this engineer. Such evaluation and testing is repeatedly conducted in the evaluation department in accordance with the analysis results.

If the evaluator has judged that the product satisfies the requirements specification, the designer asks for its boss's approval for the CAD data. The designer then adds information (product manufacturing information (PMI)) required for manufacturing the product, such as the tolerance, surface quality, and welding positions, to the approved CAD data and stores it in a database dedicated to CAD data (hereinafter called "CAD data DB"). When storing the CAD data, the designer may create a two-dimensional drawing indicating the shape of the product, which can be printed on paper, and stores the drawing in the CAD data DB. The evaluator stores analysis data in analysis data DB for each product subjected to evaluation.

Thereafter, the product is manufactured in the manufacturing department based on the approved CAD data. The quantity of materials to be used for manufacturing the product can be determined by calculating the dimensions and volume of the product based on the CAD data, and the manufacturing cost can accordingly be estimated. Referring to PMI can also determine the number of portions to be welded, for example, so that the number of operators and facilities required for producing the product can be estimated. In this manner, data created in an upstream process can be utilized in various ways by operators in a downstream process. Hereinafter, designers, analyzers, evaluators, and estimators engaged in individual process stages for manufacturing a product will simply be called users. Information concerning a product to be manufactured, such as CAD data, analysis data, and evaluation data, generated in various process stages may collectively be called data.

The management system 1 according to the exemplary embodiment performs data management by collecting individual items of data generated in the user devices 10 used in the individual stages from the corresponding DBs and by superimposing these items of data on CAD data concerning the product. Hereinafter, information indicated by various items of data generated based on CAD data on a product will be called attributes of this product. Data concerning attributes will be called attribute data. Analysis data concerning a product based on CAD data is one example of attribute data.

Examples of attributes of a product are the distribution of 3D numeric values that varies in accordance with the shape of the product, a combination of a physical quantity (at least one of a scalar and a vector) and points represented by 3D coordinates defined in a space of a product, and information associated with each of basic elements divided from CAD data.

Examples of attribute data concerning a product are analysis data concerning the distribution of pressure applied to the product, the direction of pressure, the direction of airflow generated around the product when wind is blown to the product, and flowing of materials when the product is manufactured based on CAD data, simulation results of a temperature change when heat is applied to the product, the color distribution of the product, the distribution of materials used for the product, and the difference between the dimensions of a manufactured product and those indicated by CAD data.

Figure 2:
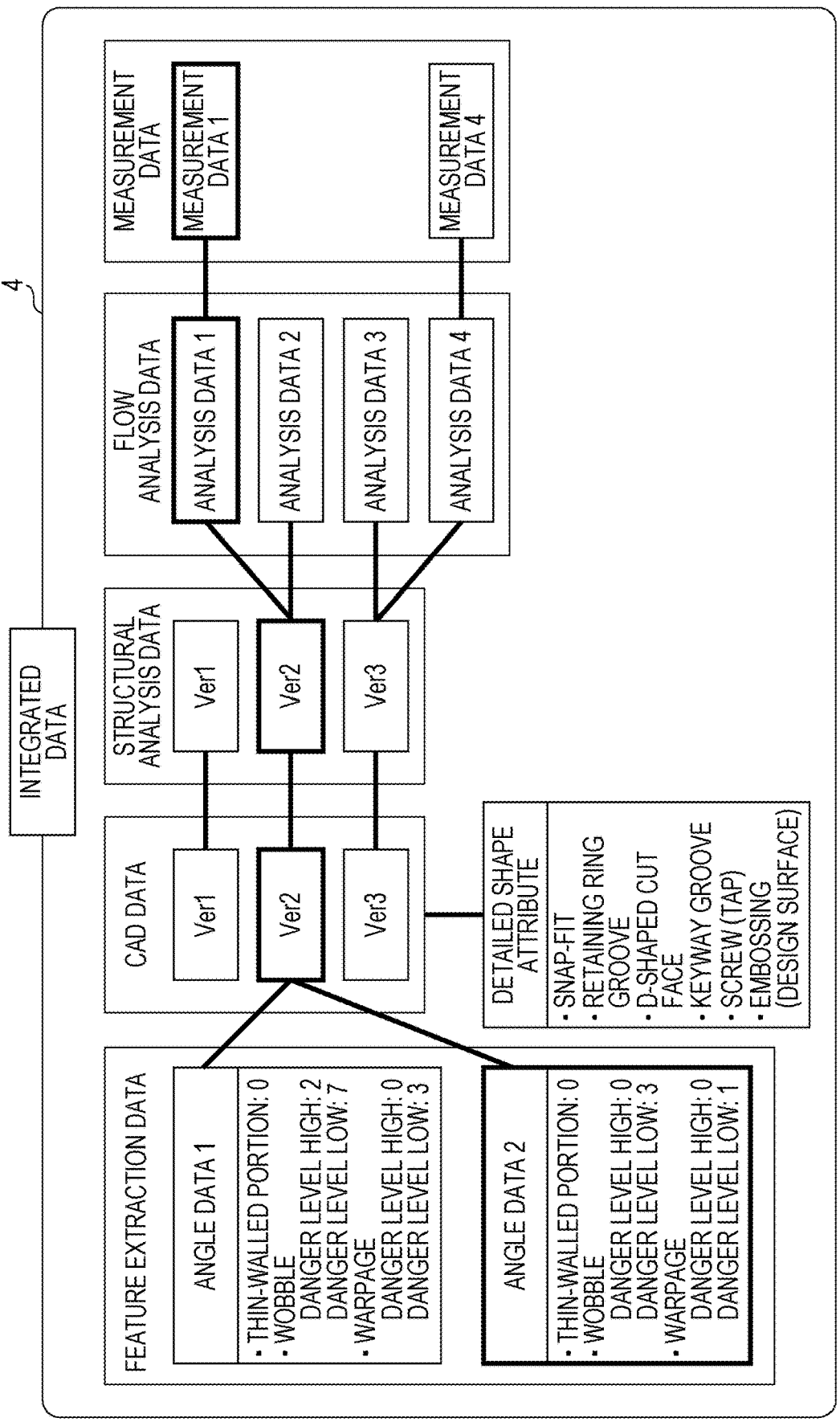
FIG. 2 illustrates an example of integrated data.

The management system 1 superimposes attribute data on CAD data so as to generate integrated data 4. In other words, the management system 1 manages the attribute data and the CAD data associated with each other as the integrate data 4. FIG. 2 illustrates an example of the integrated data 4 managed by the management system 1. In the example in FIG. 2, structural analysis data, flow analysis data, measurement data, feature extraction data, and detailed shape attributes are superimposed on the CAD data. The structural analysis data, flow analysis data, measurement data, feature extraction data, and detailed shape attributes are attribute types concerning the product indicated by the CAD data. Items of attribute data concerning these attributes superimposed on the CAD data are mostly items of data distributed in a 3D space. Attribute data other than 3D attribute data, such as the number of items of feature extraction data and text describing a situation, can be integrated as attribute data.

In the integrated data 4, attribute data is superimposed on CAD data for each version (indicated by the abbreviation "Ver") that a user has designed a product by trial and error.

A situation where a user generates different versions of CAD data will be explained below by way of example. A user has generated CAD data Ver1 concerning a product. As a result of conducting structural analysis based on CAD data Ver1, structural analysis data Ver1 showing the structural analysis results for CAD data Ver1 is generated. Then, the user has found a point that needs to be corrected from structural analysis data Ver1 and has thus generated CAD data Ver2. Structural analysis data Ver2 based on CAD data Ver2 does not show any point that needs to be corrected. As a result of fixing the problem of the previous point, however, another problem has occurred in another portion of the product. The user has thus generated CAD data Ver3. Structural analysis data Ver3 based on CAD data Ver3 shows that the problem for this portion has also been fixed. The user has found out, however, that a gap in the product only barely satisfies the requirements specification.

As product designing proceeds in this manner, three items of CAD data, Ver1, Ver2, and Ver3, are generated, and three items of structural analysis data, Ver1, Ver2, and Ver3, are respectively associated with Ver1, Ver2, and Ver3 of CAD data based on a one-on-one correspondence.

It is now assumed that a user has decided to make samples of the product based on CAD data Ver2 and CAD data Ver3 to judge which one of the versions would be utilized. The user has first set two manufacturing conditions (manufacturing condition 1 and manufacturing condition 2). The user has obtained analysis data 1, analysis data 2, analysis data 3, and analysis data 4. Analysis data 1 indicates the flow analysis result when a sample is made based on CAD data Ver2 with manufacturing condition 1. Analysis data 2 indicates the flow analysis result when a sample is made based on CAD data Ver2 with manufacturing condition 2. Analysis data 3 indicates the flow analysis result when a sample is made based on CAD data Ver3 with manufacturing condition 1. Analysis data 4 indicates the flow analysis result when a sample is made based on CAD data Ver3 with manufacturing condition 2. Flow analysis refers to analyzing of the flowing of resin and the spreading of heat when the resin is injected from an injection molding machine into a mold, and is used for predicting defects that may occur in a product during molding. The manufacturing condition is a condition indicated by a combination of various set values concerning the manufacturing of a product using a mold, such as the number of gates, which are inlets through which resin is injected into the mold.

As a result of conducting flow analysis in this manner, two items of analysis data are associated with each of CAD data Ver2 and CAD data Ver3.

As a result of examining the flow analysis data, it is found that analysis data 1 indicates the better analysis result than analysis data 2, while analysis data 4 indicates the better analysis result than analysis data 3. A sample of the product indicated by CAD data Ver2 is made with manufacturing condition 1, and a sample of the product indicated by CAD data Ver3 is made with manufacturing condition 2. The shape of each sample is then measured with a 3D scanner, and measurement data 1 and measurement data 4 are generated. Measurement data is not restricted to that obtained by a 3D scanner. For example, a user may manually make measurement by using a tester machine with a check sheet defined by a combination of a reference surface and portions to be measured. Measurement results obtained in this manner may be used as measurement data. Alternatively, the measurement results obtained by various tester machines using images, video, and a contact sensor may be converted into 3D information and be used as measurement data.

The structural analysis data, flow analysis data, and measurement data are superimposed on CAD data, as shown in FIG. 2. In this manner, depending on the content of work done by a user, attribute data may be superimposed on CAD data based on a one-on-one correspondence, or multiple items of attribute data may be superimposed on one item of CAD data.

Also, multiple items of attribute data may be superimposed on CAD data, such as analysis data 1 and analysis data 2 are associated with CAD data Ver2. A user may select an attribute type and attribute data to be superimposed on CAD data in accordance with the purpose of use.

For example, if multiple samples of the product indicated by CAD data Ver2 are made in accordance with manufacturing condition 1, a user may superimpose items of measurement data concerning all the samples on CAD data Ver2, or superimpose measurement data concerning at least one sample selected from the multiple samples on CAD data Ver2. The user may alternatively superimpose 3D measurement data concerning the sample having the shape closest to the requirements specification and that concerning the sample having the shape which is the least close to the requirements specification on CAD data Ver2. Measurement data to be superimposed on CAD data Ver2 is not only data on the dimensions of samples, but also data on the largest error, the smallest error, and the average error of samples in terms of the requirements specification and the judging results about the shapes of the samples.

For each attribute, the user selects one of plural items of attribute data superimposed on CAD data, as attribute data that represents a corresponding attribute. The selected item of attribute data representing a corresponding attribute will be called representative attribute data.

The approach to selecting representative attribute data will be discussed later. In one example, concerning each attribute, the attribute value which is ultimately selected by a user may become representative attribute data. In the above-described example, if CAD data Ver2, which is used for making the sample from which measurement data 1 is generated, is ultimately selected for manufacturing the product, CAD data Ver2, structural analysis data Ver2, analysis data 1, and measurement data 1 serve as representative attribute data representing the corresponding attributes of the product. In FIG. 2, the items of representative attribute data are highlighted by the thick lines.

If the shape of the product indicated by CAD data includes a distinctive shape appended with a specific name, information on the distinctive shape may be superimposed on CAD data as a detailed shape attribute. Hereinafter, a distinctive shape appended with a specific name which is easily recognized by users will be called a detailed shape.

Figure 3:
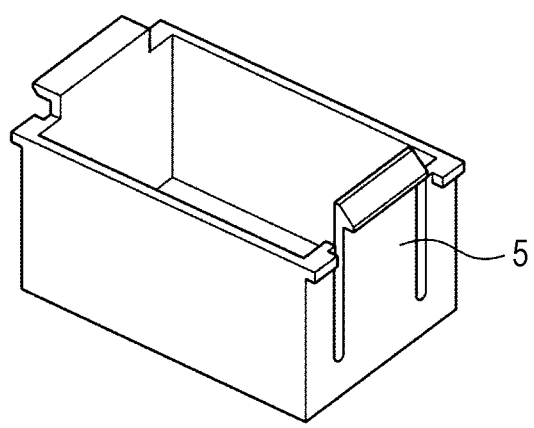
FIG. 3 illustrates an example of a snap-fit.
Figure 4:
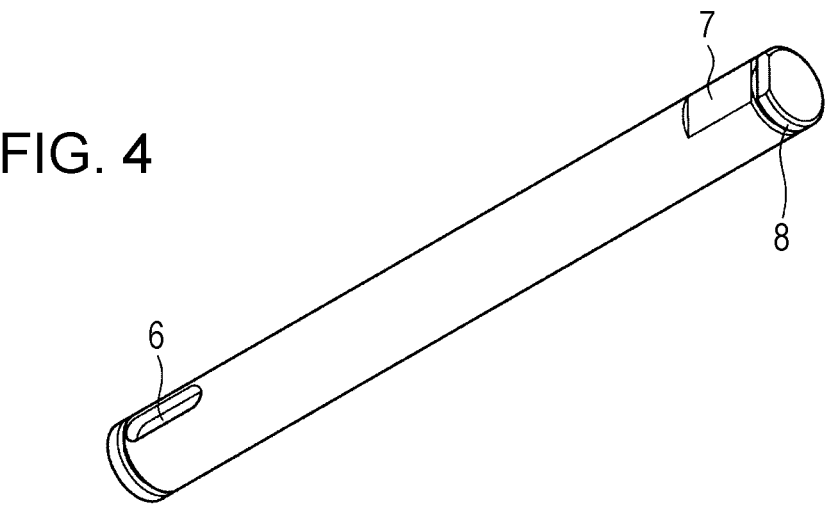
FIG. 4 illustrates an example of each of a keyway groove, a D-shaped cut face, and a retaining ring groove.

Examples of the detailed shape are a snap-fit 5 shown in FIG. 3, a keyway groove 6, a D-shaped cut face 7, and a retaining ring groove 8 shown in FIG. 4.

The snap-fit 5 is used for fitting two parts of a product into each other without using screws but merely by the spring characteristics of resin. The keyway groove 6 is a groove for receiving a fastening part (called a key) used for fixing a part, such as a gear, to a shaft. The retaining ring groove 8 is a groove cut along the circumferential direction of the shaft and is used for receiving a retaining ring for fixing a part to the shaft. The D-shaped cut face 7 is a surface which is machined so that part of the shaft in the circumferential direction becomes flat. The D-shaped cut face 7 is named as such because the machined surface looks like an alphabetical letter "D" when it is viewed in the axial direction. Two D-shaped cut faces 7 opposing each other or perpendicular to each other may be provided.

Other examples of the detailed shape are screws and emboss processing. Emboss processing is processing made on the surface of a product. Various patterns can be made by emboss processing.

By superimposing such detailed shape attributes of the product on CAD data, not only a function of searching for integrated data 4 by using the overall shape of a product, but also a function of searching for integrated data 4 by specifying a detailed shape attribute are provided as a search function for a product, which will be discussed later.

Superimposing of detailed shape attributes on CAD data will be discussed later through illustration of the functional configuration of an integrator 20A shown in FIG. 22.

To manufacture a product with a 3D printer instead of injection molding, it is necessary to determine which surface of the product will be used as the bottom surface. The reason for this is as follows. In the case of a 3D printer, a product is created by stacking resin on top of each other layer by layer, and the strength of the product in the stacking direction of resin is weaker than that in a direction perpendicular to the stacking direction.

Figure 5:
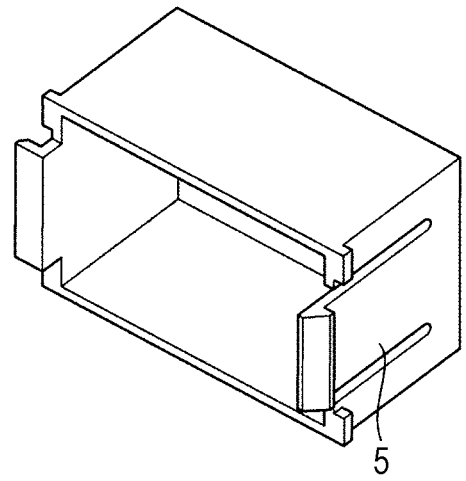
FIG. 5 illustrates an example of a snap-fit in a different creation orientation.

For this reason, when creating a product having a snap-fit 5, such as that shown in FIG. 3, with a 3D printer, it is desirable to create the product from an angle in which the orientation of the snap-fit 5 becomes perpendicular to the stacking direction of resin, as shown in FIG. 5.

In this manner, a user sometimes conducts analysis by simulations to determine from which angle a product indicated CAD data is supposed to be created in order to reduce thin-walled portions that are easy to lose their strength and portions having a high danger level of wobble or warpage.

The analysis results are stored as feature extraction data in a feature extraction DB in association with a product and each angle at which analysis is made. As shown in FIG. 2, the management system 1 manages the integrated data 4 also by superimposing such feature extraction data on CAD data. In the example of FIG. 2, angle data 2 showing that portions having a high danger level of wobble are fewer than in angle data 1 is selected as representative attribute data representing the feature extraction data.

To create a product with a 3D printer, a mold for the product is not necessary, which also eliminates the need to set manufacturing conditions. CAD data, structural analysis data, detailed shape attributes, and feature extraction data are managed together in the integrated data 4.

As described above, not only representative attribute data concerning each attribute, but also data showing some design problem (failure data) which has not been selected are superimposed on CAD data and are managed.

Figure 6:
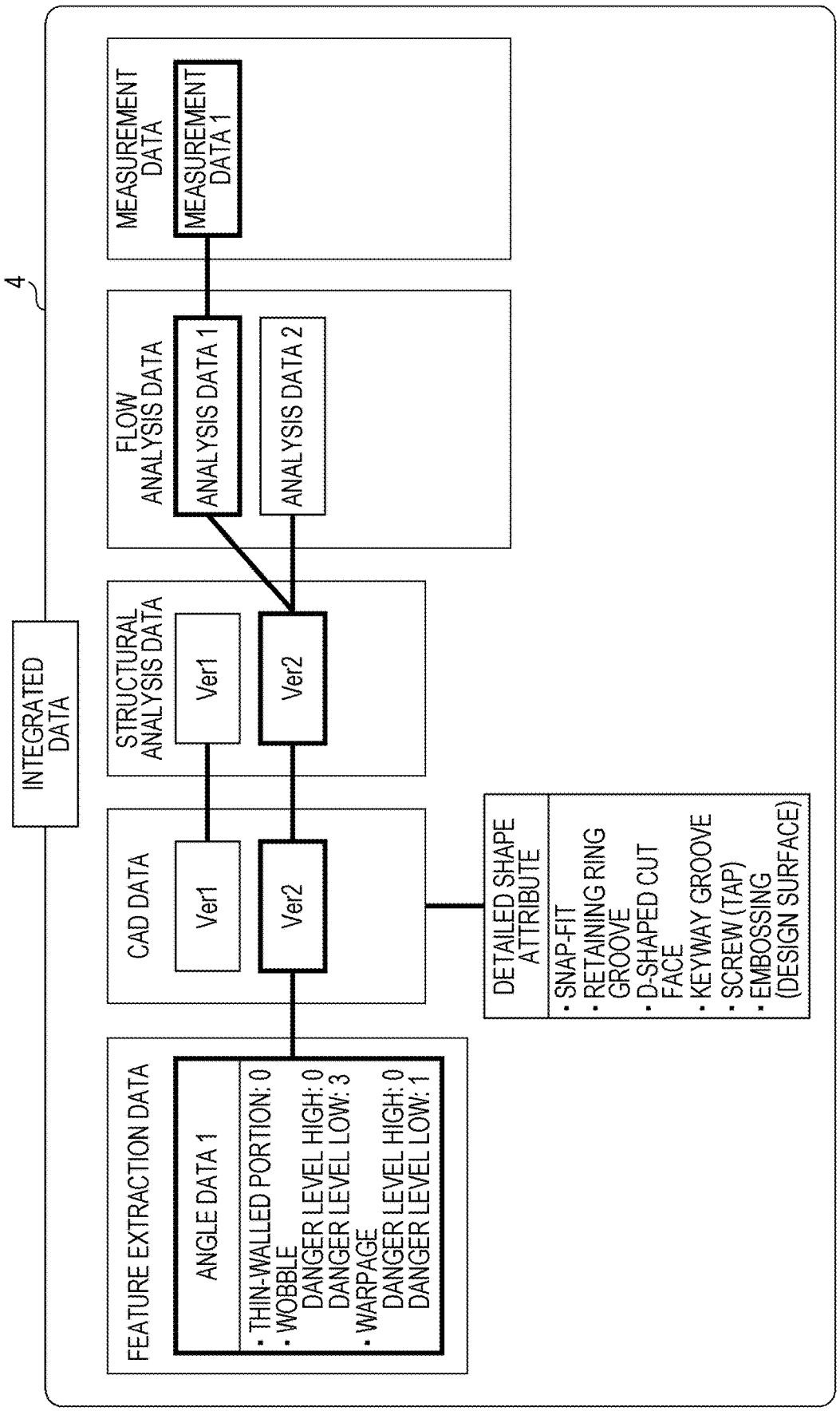
FIG. 6 illustrates another example of integrated data.

FIG. 6 illustrates another example of integrated data 4 managed by the management system 1.

It is assumed that a user has found a point that needs to be corrected from structural analysis data Ver1 associated with CAD data Ver1, and has thus generated CAD data Ver2. Structural analysis data Ver2 based on CAD data Ver2 does not show any point that needs to be corrected. The user has then obtained analysis data 1 indicating the flow analysis result when a sample is made based on CAD data Ver2 with manufacturing condition 1 and analysis data 2 indicating the flow analysis result when a sample is made based on CAD data Ver2 with manufacturing condition 2.

As a result of examining the two items of analysis data, it is found that analysis data 1 indicates the better analysis result than analysis data 2. A sample of the product is then made based on CAD data Ver2 with manufacturing condition 1. The shape of the sample is then measured with a 3D scanner, and the obtained measurement data is set as measurement data 1.

If CAD data Ver2, which is used for making the sample from which measurement data 1 is generated, is selected for manufacturing the product, CAD data Ver2, structural analysis data Ver2, analysis data 1, and measurement data 1 serve as representative attribute data representing the corresponding attributes of the product.

When a 3D printer is used to create a product, the angle of the product is a major factor, as discussed above. An experienced user skilled in the creation of a product with a 3D printer is capable of determining the angle optimal for the product at once without taking a trial-and-error approach, based on the past knowledge. In this case, in the integrated data 4 shown in FIG. 6, only one item of feature extraction data represented by angle data 1 is superimposed on CAD data Ver2. When a product is created with a 3D printer, CAD data, structural analysis data, detailed shape attributes, and feature extraction data are managed together in the integrated data 4.

In this manner, some users design or manufacture a product while variously changing engineering conditions which may influence the designing or manufacturing of the product. Other users can determine the engineering condition that is optimal for a product and make analysis with only one condition. If the number of engineering conditions falls short of a predetermined number, the management apparatus 20 also collects CAD data and attribute data generated when a product is designed with a condition different from that considered by a user. This will be explained later. Collecting attribute data means collecting attribute data concerning each attribute of a product. A manufacturing condition for a product is also an example of attributes. The manufacturing condition is associated with flow analysis data, for example, and is managed in the integrated data 4.

Figure 7:
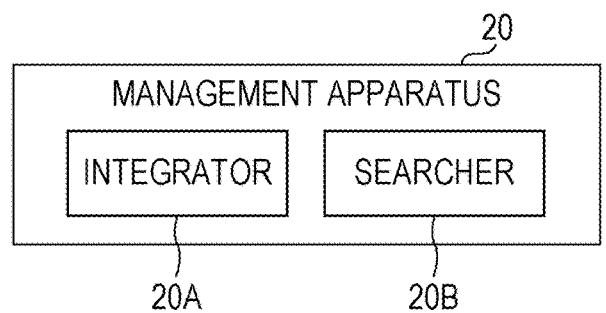
FIG. 7 is a block diagram illustrating an example of the functional configuration of a management apparatus.

FIG. 7 is a block diagram illustrating an example of the functional configuration of the management apparatus 20 included in the management system 1. The management apparatus 20 includes an integrator 20A and a searcher 20B. In accordance with a collection rule for obtaining attribute data concerning a product, the integrator 20A autonomously collects attribute data generated in individual process stages before the product is manufactured, and then integrates CAD data and attribute data so as to generate integrated data 4. The searcher 20B searches for integrated data 4 that satisfies a search condition specified by a user, converts attribute data concerning each attribute included in the integrated data 4 in response to a request from the user, and then outputs the converted attribute data.

Figure 8:
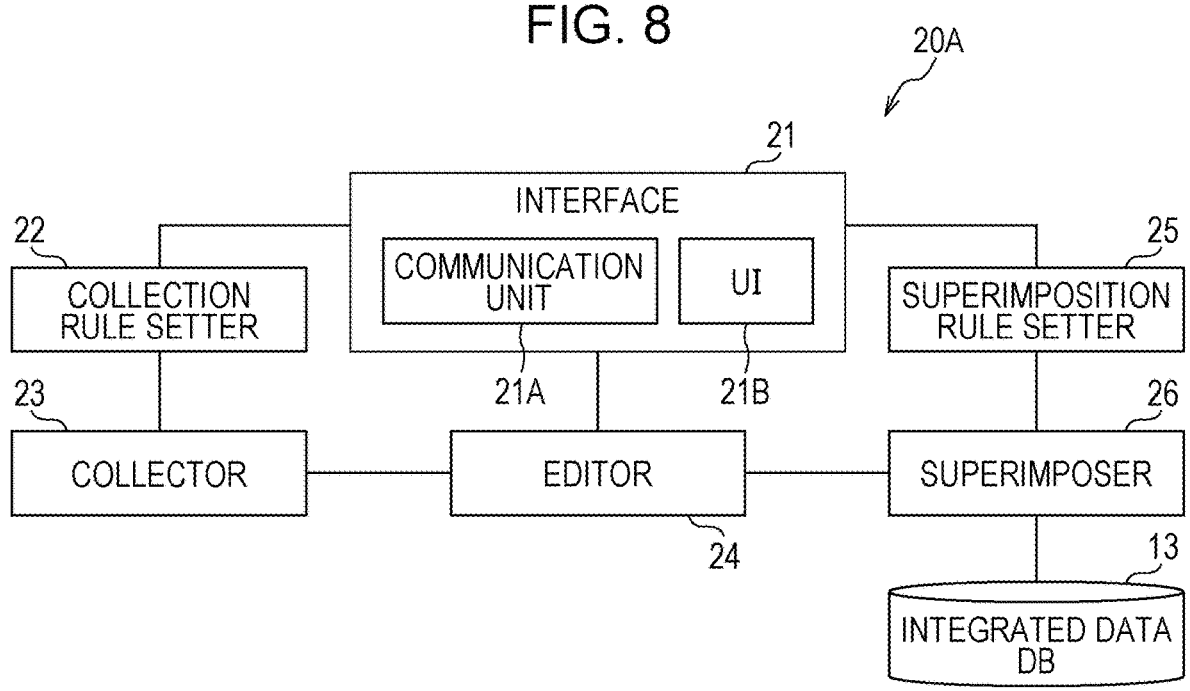
FIG. 8 is a block diagram illustrating an example of the functional configuration of an integrator.

FIG. 8 is a block diagram illustrating an example of the functional configuration of the integrator 20A. As shown in FIG. 8, the integrator 20A includes an interface 21, a collection rule setter 22, a collector 23, an editor 24, a superimposition rule setter 25, a superimposer 26, and an integrated DB 13. The interface 21 includes a communication unit 21A and a user interface (UI) 21B.

The interface 21 has an interface function. By using the interface function, the interface 21 receives an instruction from a user and various items of data from a user device 10, and also informs a user of a search result of integrated data 4 and requests the user device 10 to execute specified processing. When communicating with the user device 10, the interface 21 receives various items of data from the user device 10 and requests the user terminal 10 to execute specified processing via the communication unit 21A using the communication network 2. When communicating with a user, the interface 21 receives an instruction from the user and notifies the user of processing results generated in the management apparatus 20 via the UI 21B.

The collection rule setter 22 sets a collection rule for collecting attribute data to be managed in the integrated data 4, in accordance with an instruction received by the interface 21 from a user.

In accordance with the collection rule set by the collection rule setter 22, the collector 23 collects, via the communication network 2, attributes and CAD data concerning a product from at least one of the user device 10 and DBs storing attributes of the product generated in the user device 10.

The editor 24 makes preparation for superimposing the CAD data and attribute data collected by the collector 23. More specifically, the editor 24 specifies representative attribute data concerning the collected CAD data and that concerning the collected attribute data. If the number of engineering conditions falls short of the predetermined number, the editor 24 also creates engineering conditions different from those used for the collected CAD data and attribute data until the predetermined number of engineering conditions are generated, and requests the user device 10 to design or analyze the product based on the created conditions. The editor 24 then causes the collector 23 to collect CAD data and attribute data based on the created conditions. The editor 24 also adjusts the resolution of CAD data and that of attribute data with each other so that the attribute data can be superimposed on the CAD data in the superimposer 26, which will be discussed later.

Resolution is the distance between adjacent items of data. As the distance between adjacent items of data is smaller, the density of data concerning a product becomes higher. The shape of the product indicated by CAD data and attributes of the product are then described in greater detail.

The superimposition rule setter 25 sets superimposition rule which defines the association between CAD data and attribute data in accordance with an instruction received from a user via the interface 21.

The superimposer 26 superimposes the attribute data on the CAD data in accordance with the superimposition rule set by the superimposition rule setter 25, and generates integrated data 4 that manages the superimposition relationship between the CAD data and the attribute data. The superimposer 26 then stores the generated integrated data 4 in the integrated DB 13.

An example of the functional configuration of the searcher 20B will be discussed later.

Examples of the major elements of the electrical system configuration of the management apparatus 20 will now be described below.

Figure 9:
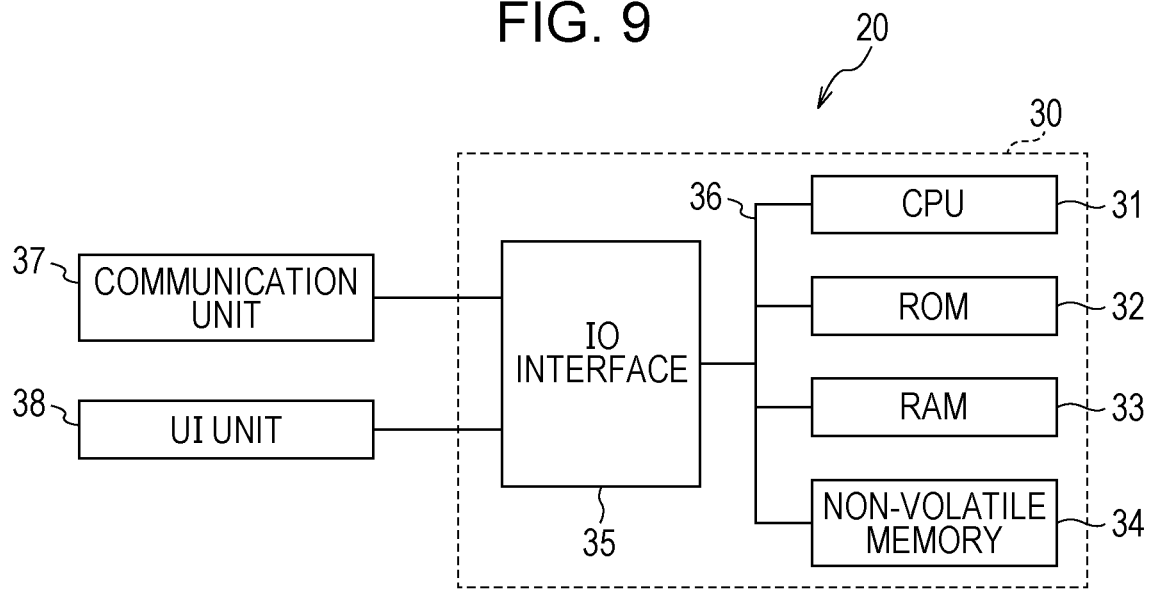
FIG. 9 illustrates examples of the major elements of the electrical system configuration of the management apparatus.

FIG. 9 illustrates examples of the major elements of the electrical system configuration of the management apparatus 20. The management apparatus 20 is constituted by a computer 30, for example.

The computer 30 includes a central processing unit (CPU) 31, a read only memory (ROM) 32, a random access memory (RAM) 33, a non-volatile memory 34, and an input/output (IO) interface 35. The CPU 31 controls processing concerning the management apparatus 20. The ROM 32 stores a management program for causing the computer 30 to serve as the individual elements of the management apparatus 20. The RAM 33 is used as a temporary work area for the CPU 31. The CPU 31, the ROM 32, the RAM 33, the non-volatile memory 34, and the IO interface 35 are connected to one another via a bus 36.

The non-volatile memory 34 is an example of a storage device that can retrieve stored information even after power supplied to the non-volatile memory 34 is interrupted. As the non-volatile memory 34, a semiconductor memory, for example, is used, or a hard disk may alternatively be used. The non-volatile memory 34 may not necessarily be built in the computer 30, and may be a portable storage device that is attachable to and detachable from the computer 30.

A communication unit 37 and a UI unit 38, for example, are connected to the IO interface 35.

The communication unit 37 has a communication protocol for connecting to the communication network 2 and performing data communication with the user devices 10, DBs storing CAD data and attribute data concerning a designed product, and an external device, such as a file server, that are also connected to the communication network 2.

The UI unit 38 is a unit for providing an interface between the management apparatus 20 and a user. The UI unit 38 receives an instruction from a user and supplies the instruction to the CPU 31 and also supplies information processed by the CPU 31 to a user. The UI unit 38 includes an input device, such as a keyboard and a mouse, to receive an instruction from a user, and an output device, such as a light emitting diode (LED) and a liquid crystal display, to supply processed information to a user.

Figure 10:
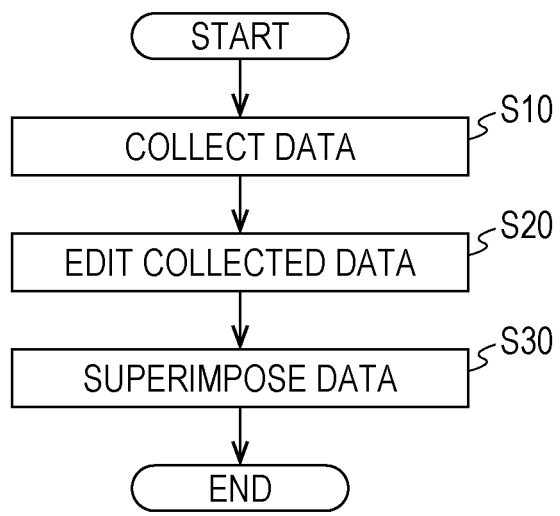
FIG. 10 is a flowchart illustrating an example of a procedure of management processing.

FIG. 10 is a flowchart illustrating a procedure of management processing executed by the CPU 31 of the management apparatus 20.

The management program which defines this management processing has been stored in the ROM 32 of the management apparatus 20, for example. The CPU 31 reads the management program stored in the ROM 32 and executes the management processing.

It is assumed that product CAD data is stored in the storage of a user device 10 provided with a design tool, and attribute data indicating the corresponding analysis results is stored in the storage of certain user devices 10 provided with various analysis tools.

If the condition described in the collection rule set by a user is satisfied, in step S10, the CPU 31 collects data concerning a certain product from the user devices 10.

Every time the user finds it necessary to collect data concerning the product, it may instruct the management apparatus 20 to collect data. If, however, a collection rule is set, the CPU 31 refers to it, and when it has judged that the condition described in the collection rule is satisfied, the CPU 31 can autonomously start collecting data.

The content of the collection rule is not particularly restricted. In one example, the start timing of data collection may be determined in accordance with the working situation of a user with the user device 10. For example, at a timing at which data is stored with a specified type of tool, the predetermined number of items of data are stored, the predetermined amount of data is stored, or a file name of stored data accords with a specified file name, data collection may be started.

In another example, when a condition concerning the collection time is satisfied, data collection may be started. For example, when a specified time has arrived, data collection may be started. Alternatively, data collection may be performed at regular intervals.

In another example, data collection may be performed in synchronization with user schedule. For instance, the CPU 31 may refer to user schedule information stored in an external device and collect data during a time period when the user attends a meeting or the user is out on a business trip so as not to disturb user's work.

In another example, data collection may be started when data is stored in a specific data storage region, such as in a database storing approved data.

The collection rule may be set in accordance with a flow of work in each process stage, such as a designing stage and a manufacturing stage. For instance, data collection may be started when CAD data designed by a user or the analysis results obtained by a user are approved by their boss or at a timing when work in each process stage has been completed and the process shifts to another stage.

In step S20, the CPU 31 edits the data collected in step S10.

Data editing involves various types of processing. In one example, the CPU 31 specifies representative attribute data from the collected items of CAD data and that from the collected items of attribute data. Various approaches to specifying representative attribute data may be employed. For example, CAD data and attribute data concerning each attribute type collected by the CPU 31 are displayed on the UI unit 38, and a user is instructed to select an item of CAD data and attribute types and also to select an item of attribute data concerning each of the selected attribute types. The CPU 31 then associates the selected attribute types with the selected item of CAD data and sets the selected item of attribute data concerning each of the selected attribute types to be the representative attribute data. If the user selects the attribute value ultimately selected for manufacturing the product for each of the selected attribute types, the representative attribute data corresponds to the attribute value used for the manufactured product.

The CPU 31 may alternatively select representative attribute data in accordance with a preset specific rule.

The specific rule defines a condition for the item of attribute data which satisfies more specifications required for a product than the other items of attribute data. The CPU 31 selects the item of attribute data that satisfies the specific rule as representative attribute data. For example, the item of attribute data that a user has viewed or used in a user device 10 for the longer time than the other items of attribute data, the item of attribute data that more users have viewed or used, or the item of attribute data which satisfies more requirements of the specification is selected as representative attribute data in accordance with the specific rule.

In this case, additional information is required for determining whether each item of attribute data satisfies the specific rule. The CPU 31 collects such additional information from each user device 10 or an external device in accordance with the content of the specific rule, together with the data collected in step S10.

The specific rule is set by a user in advance and is stored in the non-volatile memory 34. In this case, the user may set plural specific rules and the CPU 31 may select one of them based on the tendency of work conducted by the user, which is represented by the collected additional information. For example, the CPU 31 initially displays candidates of representative attribute data on the UI unit 38, and the user is instructed to select one of the candidates. The CPU 31 learns the user's selection tendency of attributes and selects the optimal specific rule for the user based on the selection tendency. Once the selection rule is set, the CPU 31 specifies representative attribute data in accordance with the selected specific rule until an instruction to change the specific rule is received from the user.

Figure 11:
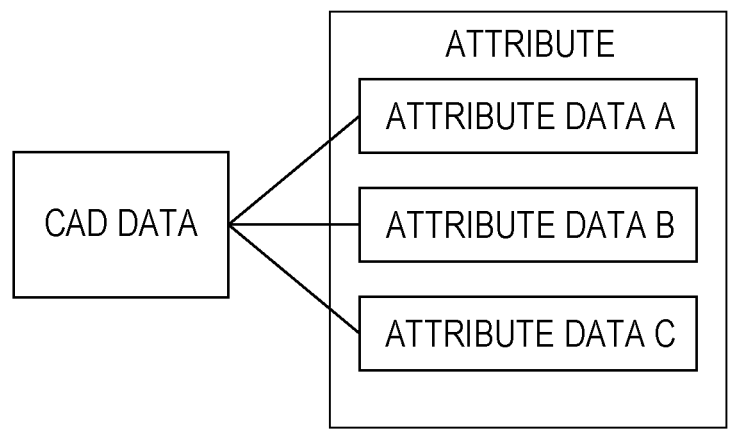
FIG. 11 illustrates an example in which representative attribute data is specified.

The CPU 31 may first specify one item of CAD data as representative attribute data and then specify one item from among plural items of attribute data on each attribute associated with the selected item of CAD data. FIG. 11 shows an example in which, from among three items of attribute data concerning a certain attribute, i.e., attribute data A, attribute data B, and attribute data C, one item of attribute data is selected as representative attribute data to be associated with CAD representative attribute data.

Figure 12:
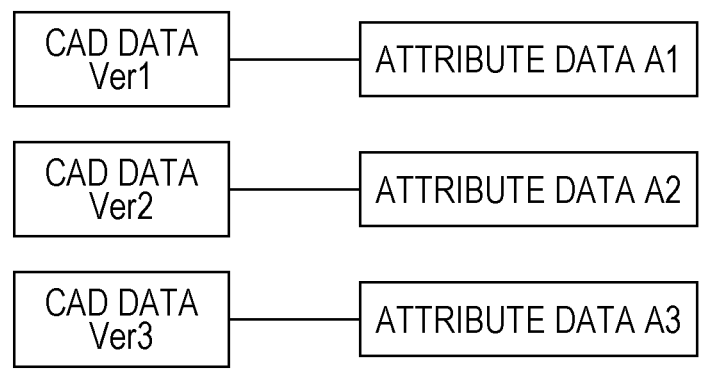
FIG. 12 illustrates another example in which representative attribute data is specified.

Alternatively, for each of multiple items of CAD data, the CPU 31 may associate attribute data concerning each attribute with the corresponding item of CAD data in advance, and then select one of plural pairs of CAD data and attribute data as a combination of representative attribute data. For example, as shown in FIG. 12, CAD data Ver1 and attribute data A1 are associated with each other as a pair, CAD data Ver2 and attribute data A2 are associated with each other as a pair, and CAD data Ver3 and attribute data A3 are associated with each other as a pair. From among these pairs, one pair of CAD data and attribute data may be set as a combination of representative attribute data concerning a corresponding attribute.

The data collected in step S10 is data generated based on the conditions considered by a user. A user in a downstream process, however, may find it insufficient to utilize such data to do a task assigned to the user.

For example, users in a downstream process may encounter the following situations. It is now assumed that this user is assigned to a task for another product. As a result of conducting flow analysis for CAD data on this product by setting a specific manufacturing condition, warpage has occurred in the product in excess of the requirements specification. To reduce the occurrence of warpage in the product, the user wishes to refer to the manufacturing condition set for a past product having a similar shape. Or, another user is creating a product with a 3D printer, but it does not know from which angle the product is supposed to be created and may wish to check the creation angle of a past product having a similar shape.

In the above-described situations, if only final design data concerning a past product is included in integrated data 4, the manufacturing condition used when the occurrence of warpage has been reduced may not be superimposed on CAD data, or feature extraction data concerning various creation angles may not be superimposed on CAD data.

Additionally, some users do not register failure data that has not been selected for manufacturing a product in integrated data 4 after they have tried various manufacturing conditions and creation angles, and merely store such failure data only for their reference.

As a result, even if a user assigned to a task for another product has referred to integrated data 4 on a similar past product, it may not be able to always obtain useful information which may deal with the above-described issues.

In light of the above-described situations, the CPU 31 generates an engineering condition different from the conditions already considered by a user, that is, an engineering condition different from the conditions used when attribute data included in integrated data 4 has been generated. A new condition generated by the CPU 31 will be called an additional engineering condition. Then, the CPU 31 sets, as a new attribute value, the analysis result obtained when the product indicated by CAD data is analyzed based on the additional engineering condition.

Examples of the additional engineering condition to be added to the conditions considered by a user are a value indicating a different manufacturing condition regarding the number of gates or the positions of the gates in injection molding, a value indicating a different structural analysis condition regarding force to be applied to a product or the direction of force, and new threshold values for determining thin-walled portions and the danger level of warpage and wobble of the product indicated by feature extraction data.

Regarding the creation angle of a product to be created with a 3D printer, a desired angle may be set as an additional engineering condition. In this case, instead of setting the angle, if a product defined by the XYZ coordinate system representing the length, width, and height is created with a 3D printer, the CPU 31 may specify which surface of the product formed by the sides along two of the three axes to be used as the bottom surface.

The CPU 31 may calculate the angle of the product at which the volume of a bounding box surrounding the shape of the product indicated by CAD data is minimized. The CPU 31 may then set an additional engineering condition for generating feature extraction data by using the angle of the product at which, among the length, width, and height of the bounding box, the shortest side serves as the height direction when the product is created with a 3D printer. In this case, the resin layers to be stacked on top of each other is minimized, thereby reducing the time taken to manufacture the product. This angle is frequently used for manufacturing a product. If a user has not considered generating feature extraction data by using this angle, the CPU 31 may set this angle as an additional engineering condition even without an instruction from the user.

The CPU 31 may set an additional engineering condition for generating feature extraction data by using the angle of the product at which, among the length, width, and height of the bounding box, the surface defined by the shortest side and the second shortest side serves as the bottom surface when the product is created with a 3D printer. In this case, the number of items of this product that can be manufactured at one time with one 3D printer is maximized, thereby enhancing the manufacturing efficiency. This angle is also frequently used for manufacturing a product. If a user has not considered generating feature extraction data by using this angle, the CPU 31 may set this angle as an additional engineering condition even without an instruction from the user.

The CPU 31 may also rotate a product represented by CAD data and calculate the angle at which a support material required for creating the product with a 3D printer is minimized or the angle at which the number of the lowest points is minimized. If a user has not considered generating feature extraction data by using this angle, the CPU 31 may set this angle as an additional engineering condition even without an instruction from the user.

The CPU 31 may also set the resolution different from that of collected CAD data as an additional engineering condition. In this case, CAD data represented by the newly set resolution is generated.

The resolution of CAD data refers to the resolution of product 3D shape data represented by polygons or voxels. In the case of polygons, the resolution is the fineness of a triangle, for example. In the case of voxels, the resolution is the size of one side of one voxel, for example. The resolution of attribute data is the sampling interval used for sampling attribute data. As the resolution becomes higher, the density of product data becomes higher. The shape of the product indicated by CAD data and attributes of the product are described in greater detail.

Multiple levels of resolution may be set as additional engineering conditions so that the resolution of multiple items of CAD data is sequentially changed. Then, multiple items of CAD data indicating the same product with different levels of resolution, such as CAD data indicating a product with a rough shape and that indicating the same product with a detailed shape, can be obtained.

The CPU 31 may determine the resolution of CAD data to be set as an additional engineering condition, based on the complexity of the shape of the product indicated by the CAD data and the resolution of attribute data concerning this product.

If, for each attribute, the number of conditions considered by a user for collected CAD data falls short of the predetermined number, the CPU 31 continues to set an additional engineering condition until the predetermined number of engineering conditions are generated. The CPU 31 then obtains attribute values generated based on the additional engineering conditions. Different predetermined numbers of engineering conditions may be set for individual attributes.

The CPU 31 identifies the user terminal 10 assigned to the designing task and that to the analyzing task in accordance with the content of designing and that of analyzing. The CPU 31 then sends the additional engineering conditions to these user terminals 10 and instructs them to redesign or reanalyze the product, and collects attribute values calculated based on the additional engineering conditions from the user devices 10. If the management apparatus 20 contains a design tool and an analysis tool, the CPU 31 may not necessarily send the additional engineering conditions to the user terminals 10 and instruct the management apparatus 20 to generate attribute values based on the additional engineering conditions.

Before instructing the user devices 10 to redesign or reanalyze the product based on the additional engineering conditions, it is desirable that the CPU 31 check the loads of the user devices 10. When the load factor of each user device 10 is a predetermined threshold or lower, the CPU 31 sends an instruction to redesign the product and an instruction to reanalyze the product to the corresponding user devices 10, together with the additional engineering conditions.

If the management apparatus 20 generates attribute values based on the additional engineering conditions, it is desirable that the CPU 31 check its load. When the load factor is a predetermined threshold or lower, the CPU 31 generates attribute values based on the additional engineering conditions.

To make it easy to examine the shape of the product in a downstream process, the CPU 31 may convert CAD data into a format specified by a user. CAD data may be represented in any format, such as polygon data, surface modeling data, and voxel data.

A voxel is a basic element forming a 3D shape of a product. The CPU 31 expresses the shape of the product indicated by CAD data by using a combination of voxels. As a voxel, a cube is used, but another 3D element, such as a rectangular parallelepiped, a triangular pyramid, a sphere, a cylinder, may be used.

Voxels can express various items of information, such as the color, strength, material, and texture. Not only the shape of a product, but also the color and the material of the product, for example, can be associated with voxels according to the presence or absence of voxels or by information expressed by voxels.

Texture is information that expresses texture from touch or physical properties of a product other than the color represented by the reflectance, transmittance, gloss, and surface quality.

In step S30, the CPU 31 generates integrated data 4 by superimposing certain attributes of the products on each item of CAD data and centrally manages the CAD data and the attributes of the product. In this case, the CPU 31 generates integrated data 4 by including at least representative attribute data concerning each attribute in the integrated data 4.

The superimposition rule stored in the non-volatile memory 34 indicates in which manner the attributes of a product are superimposed on CAD data. If a user conducts analysis on CAD data with an analysis tool without changing the orientation of the product indicated by the CAD data, it is not necessary to change the positions of attribute values obtained as the analysis results. Accordingly, as the superimposition rule, the rule that the generated attribute values of attributes are superimposed on CAD data without changing the three-dimensional distribution of the attribute values is set.

In practice, however, a user often conducts analysis on CAD data with an analysis tool based on various engineering conditions. In this case, the user has to change the orientation of the product indicated by the CAD data. In this manner, if the orientation of the product used for making analysis is different from that indicated by CAD data, it is necessary to adjust the three-dimensional distribution of attribute values to the orientation of the product indicated by the CAD data before the attribute values are superimposed on the CAD data.

To adjust the three-dimensional distribution of attribute values to CAD data, best-fit matching, bounding-box matching, center matching, and centroid matching, for example, may be employed.

In best-fit matching, adjustment is made so that the 3D shape of a product indicated by CAD data can best match the 3D shape of a product that is assumed from the three-dimensional distribution of attribute values. Then, the attribute values are superimposed on the corresponding positions of the CAD data.

In bounding-box matching, adjustment is made so that the bounding box of a product indicated by CAD data can match that of a product that is assumed from the three-dimensional distribution of attribute values. Then, the attribute values are superimposed on the corresponding positions of the CAD data.

In center matching, the center of the 3D shape of a product indicated by CAD data and that of a product that is assumed from the three-dimensional distribution of attribute values are adjusted with each other so that the two 3D shapes match each other as precisely as possible. Then, the attribute values are superimposed on the corresponding positions of the CAD data.

In centroid matching, the centroid of a product is calculated by using the weight distribution of the product indicated by CAD data, and then, the centroid of the 3D shape of the product indicated by CAD data and that of a product that is assumed from the three-dimensional distribution of attribute values are adjusted with each other. In short, centroid matching is an adjustment technique by replacing the center in center matching with the centroid.

The CPU 31 may superimpose attribute values on CAD data by rotating the three-dimensional distribution of the attribute values in the orientation specified by a user.

Different superimposition rules may be set for individual attributes of a product. It is desirable, however, that, for the same attribute of the product, all attribute values be superimposed on CAD data in accordance with the same superimposition rule, regardless of whether the attribute value is the value indicated by representative attribute data.

The CPU 31 may process attribute values before superimposing them on CAD data in accordance with the superimposition rule.

For example, an analysis tool may execute various arithmetic operations to analyze a product. If the analysis tool makes analysis by using the same level of resolution as that of CAD data, the time taken to output analysis results may exceed a permissible time. The analysis tool may thus lower the resolution of CAD data to conduct analysis.

Such an inconsistency between the resolution of CAD data and that of attribute data may appear, not only in the analysis results output from an analysis tool, but also in results of another factor. For example, the resolution of a physical quantity of a product measured by a sensor may vary depending on the number of sensors. Accordingly, the resolution of measured values of sensors may become different from that of CAD data. When a sensor measures a physical quantity of a portion of a product only selected by a user, the resolution of the measurement result may also become different from that of CAD data.

Figure 13:
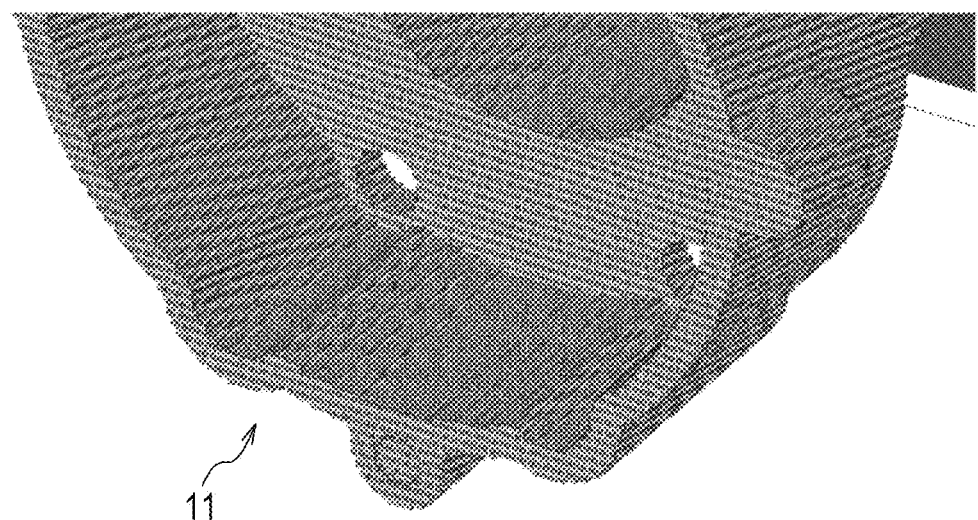
FIG. 13 illustrates an example of CAD data.
Figure 14:
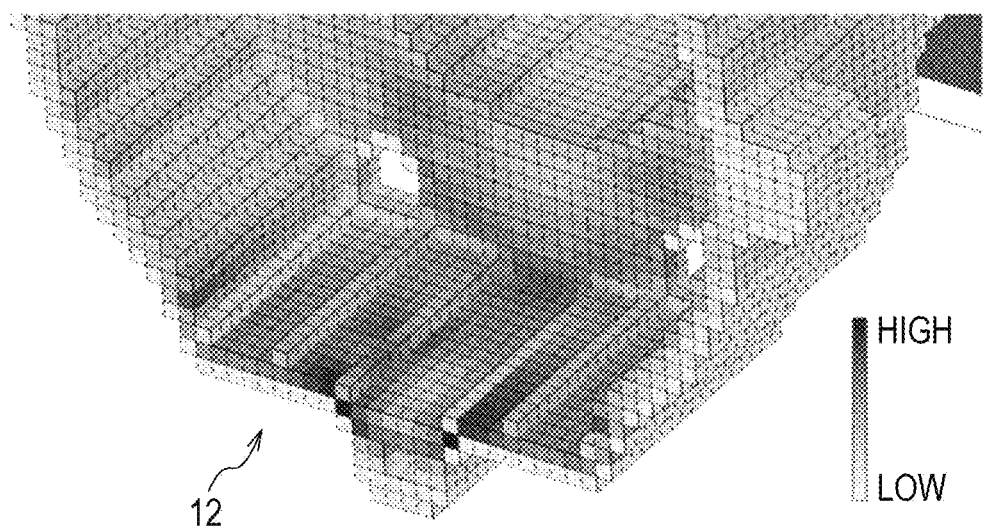
FIG. 14 illustrates a distribution example of attribute values.

FIG. 13 illustrates an example of CAD data to be analyzed. FIG. 14 illustrates a distribution example of attribute values of distortion energy based on the maximum distortion criterion (von Mises yield criterion) obtained as a result of conducting structural analysis with an analysis tool by lowering the resolution of the CAD data shown in FIG. 13. Hereinafter, such distortion energy will be called Mises distortion.

FIGS. 13 and 14 show that the resolution of the Mises distortion obtained from the analysis result shown in FIG. 14 is lower than that of the CAD data in FIG. 13.

It is now assumed that the distortion values at individual data points representing an attribute called the Mises distortion (hereinafter these data points will be called attribute data points 12) are associated with individual data points of the product indicated by the CAD data (hereinafter these data points will be called CAD data points 11). In this case, it is not possible to superimpose the attribute data points 12 on the CAD data points 11 based on a one-on-one correspondence because the resolution of the attributes and that of the CAD data are different.

Figure 15:
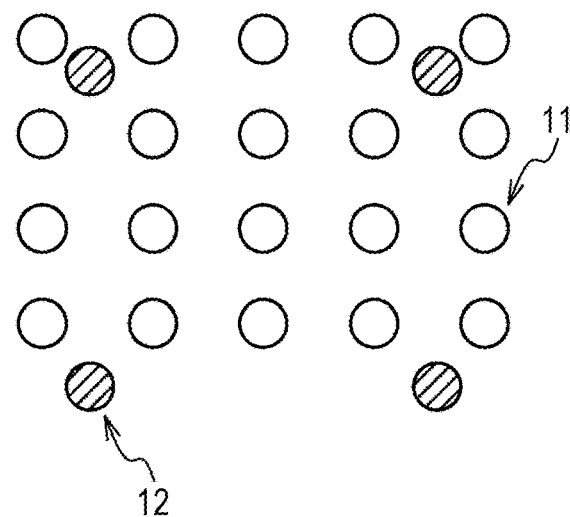
FIG. 15 illustrates an example of the association between CAD data points and attribute data points when the resolution of attribute data is lower than that of CAD data.

For easy understanding of the above-described situation, an example in which the difference in resolution expressed in a two-dimensional space is shown in FIG. 15. When the resolution of attribute data to be superimposed on CAD data is lower than that of the CAD data, the number of attribute data points 12 by unit volume is smaller than that of CAD data points 11.

It is thus necessary to interpolate attribute values of the attribute data in accordance with the resolution of the CAD data before the attribute data is superimposed on the CAD data.

Interpolation of attribute values may be conducted with the use of an interpolation function, for example.

Figure 16:
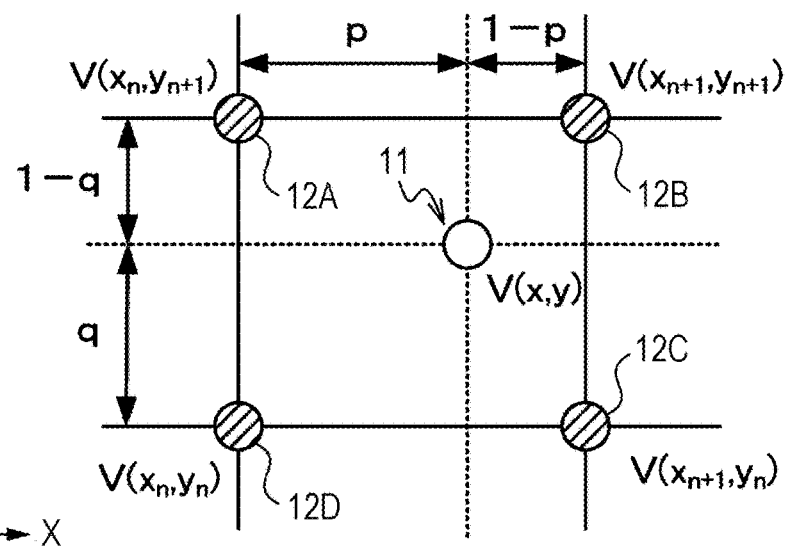
FIG. 16 illustrates an example of interpolation of attribute values.

FIG. 16 illustrates an example of interpolation of attribute values by using an interpolation function. For the sake of description, interpolation in a two-dimensional space will be explained as an example. The concept of interpolation in a two-dimensional space is applicable to that in a three-dimensional space.

To calculate the attribute value to be superimposed on the CAD data point 11 located at a specific position shown in FIG. 16 from the attribute values of plural attribute data points 12 (four attribute data points 12A through 12D in the example in FIG. 16) around the data point 11, the distance from each of the attribute data points 12 to the CAD data point 11 in the X-axis direction and that in the Y-axis direction are first calculated. Then, the attribute value to be superimposed on the CAD data point 11 is determined by proportional distribution of the attribute values at the attribute data points 12 in accordance with the calculated distances.

For example, it is assumed that the attribute value at the attribute data point 12A is $V(x_n, y_{n+1})$, the attribute value at the attribute data point 12B is $V(x_{n+1}, y_{n+1})$, the attribute value at the attribute data point 12C is $V(x_{n+1}, y_n)$, and the attribute value at the attribute data point 12D is $V(x_n, y_n)$. The position of the CAD data point 11 in the X-axis direction is represented by x, which is the position calculated by dividing the distance between adjacent attribute data points 12 in the X-axis direction at a ratio of p:(1−p). The position of the CAD data point 11 in the Y-axis direction is represented by y, which is the position calculated by dividing the distance between adjacent attribute data points 12 in the Y-axis direction at a ratio of q:(1−q). Then, the attribute value V(x,y) at the CAD data point 11 can be expressed by equation (1).

$$V(x,y)=(1-q)\{(1-p)V(x_n,y_n)+pV(x_{n+1},y_n)\}+q\{(1-p)V(x_n,y_{n+1})+pV(x_{n+1},y_{n+1})\} \quad (1)$$

Attribute data points 12 used for interpolation of attribute values (attribute data points 12A through 12D in the example of FIG. 16) will be called interpolation attribute data points 12. The number or the range of interpolation attribute data points 12 is specified by a user.

When interpolation of attribute values is performed in a three-dimensional space, the attribute values of interpolation attribute data points 12 are distributed proportionally in the Z-axis direction in accordance with the distances from the interpolation attribute data points 12 to a subject CAD data point 11 in the Z-axis direction and are added to equation (1).

As described above, the CPU 31 uses a function to approximate the attribute value at a CAD data point 11 positioned between attribute data points 12 by using the attribute values of interpolation attribute data points 12. In the above-described example, a linear function is used for interpolation of attribute values. A known nonlinear function may alternatively be used.

If attribute values are obtained from analysis using the finite element method, an element result is approximated from nodal results, thereby making it possible to perform interpolation by using the attribute values at certain positions within an element.

Alternatively, the attribute value at the attribute data point 12 closest to a subject CAD data point 11 may be used as the attribute value to be superimposed on the subject CAD data point 11. A statistical quantity, such as the average, median, and mode, of the attribute values of interpolation attribute data points 12 may be used as the attribute value to be superimposed on the CAD data point 11.

In the above-described example, techniques of interpolating attribute values when the resolution of CAD data is higher than that of attribute data have been discussed. Depending on the situation, the resolution of CAD data may be lower than that of attribute data. In this case, the CPU 31 needs to thin out attribute values and then superimposes the remaining attribute values on CAD data.

Figure 17:
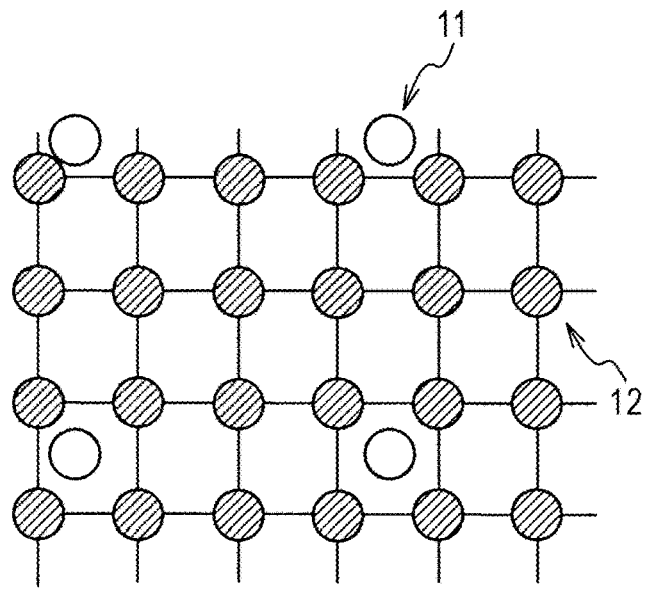
FIG. 17 illustrates an example of the association between CAD data points and attribute data points when the resolution of CAD data is lower than that of attribute data.

For easy understanding of the above-described situation, an example in which the difference in resolution expressed in a two-dimensional space is shown in FIG. 17.

When the resolution of CAD data is lower than that of attribute data, the number of CAD data points 11 by unit volume is smaller than that of attribute data points 12.

In this case, the CPU 31 thins out the attribute data points 12 so that the resolution of the CAD data matches that of the attribute data. The CPU 31 then superimposes the attribute data point 12 closest to each of the CAD data points 11 on the corresponding CAD data point 11 as the attribute value at the corresponding CAD data point 11.

Figure 18:
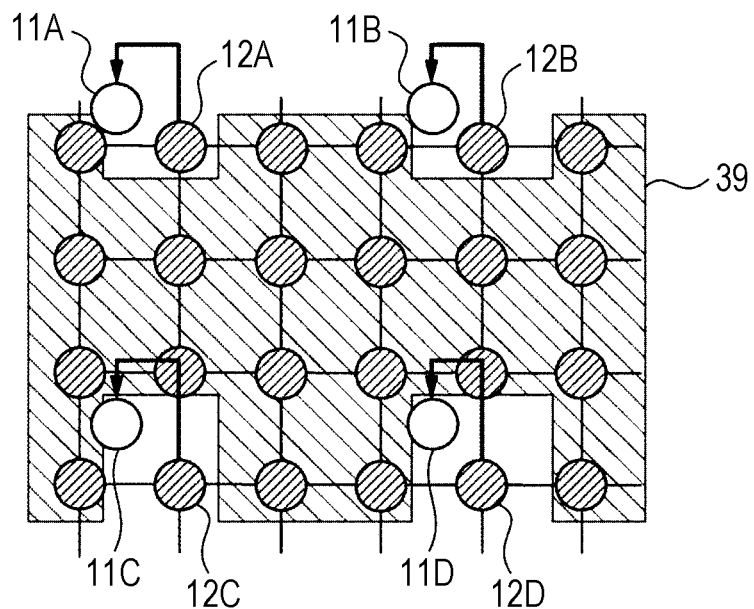
FIG. 18 illustrates an example in which attribute data points are being thinned out.

FIG. 18 illustrates that the attribute data points 12 are being thinned out. In the example in FIG. 18, after the attribute data points 12 included in a region 39 are thinned out, the attribute value of the attribute data point 12A is superimposed on the CAD data point 11A, the attribute value of the attribute data point 12B is superimposed on the CAD data point 11B, the attribute value of the attribute data point 12C is superimposed on the CAD data point 11C, and the attribute value of the attribute data point 12D is superimposed on the CAD data point 11D. In this manner, the attribute data points 12A through 12D closest to the CAD data points 11A through 11D are respectively superimposed on the CAD data points 11A through 11D.

The CPU 31 may first calculate the number of attribute data points 12 to be thinned out so that the amount of attribute data to be superimposed on CAD data becomes equal to a predetermined data amount. Then, the CPU 31 may thin out attribute data points 12 at equal intervals in accordance with the calculated number of attribute data points 12. For example, to reduce the amount of attribute data to be ⅛, the CPU 31 selects one attribute data point 12 to remain at every seven points and thins out the other attribute data points 12. The CPU 31 then superimposes the attribute values of the remaining attribute data points 12 on the closest respective CAD data points 11.

With the above-described method, however, attribute values may be superimposed on only some of the CAD data points 11, depending on the number of attribute data points 12 to thin out.

Figure 19:
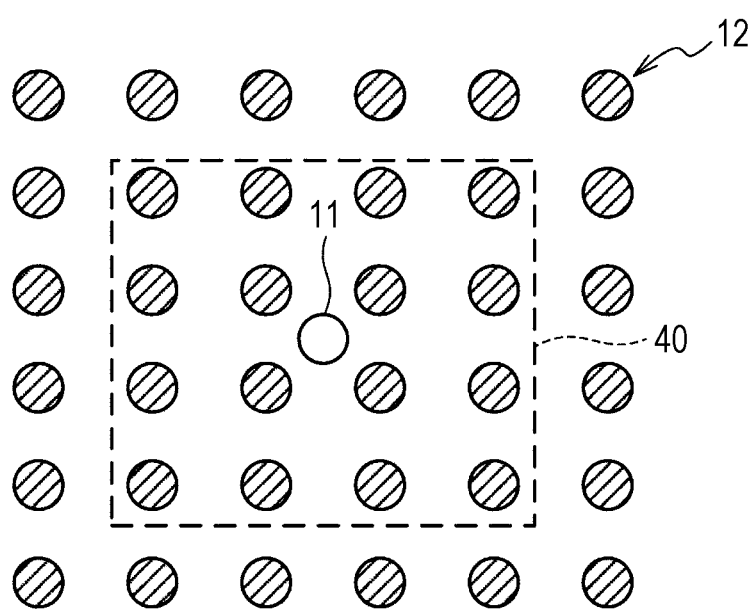
FIG. 19 illustrates another example in which attribute data points are being thinned out.

Thinning out of the attribute data points 12 is not limited to the above-described methods. For example, as shown in FIG. 19, a frame 40 is set to surround one CAD data point 11, and a statistical quantity, such as the average, median, and mode, of the attribute values of the interpolation attribute data points 12 contained in the frame 40 may be set as the attribute value to be superimposed on the CAD data point 11. Then, the CPU 31 thins out all the attribute data points 12 in the frame 40.

The CPU 31 may extract distinctive portions of the product from the detailed shape attributes or extract major portions from annotations appended by a user. The CPU 31 may then select the attribute data points 12 only at the extracted portions to remain and thin out the other attribute data points 12.

If the CPU 31 has adjusted the resolution of attribute data, it is desirable that the CPU 31 also superimpose the attribute values of the attribute data before the adjustment of the resolution on the CAD data and stores the superimposed attribute values in the integrated data 4. This may be useful for a user in a downstream process to refer to the attribute values of the attribute data before the adjustment of the resolution. The CPU 31 obtains CAD data expressed by the same resolution as the unadjusted resolution of the attribute data and superimposes the attribute values of this attribute data on the CAD data. That is, the integrated data 4 includes CAD data on which the attribute data with the unadjusted resolution is superimposed and CAD data on which the attribute data with the adjusted resolution is superimposed.

If the CPU 31 has adjusted the resolution of attribute data, it may generate association information indicating the relationship between the attribute values of attribute data with the unadjusted resolution and those of attribute data with the adjusted resolution, and store the association information in the integrated data 4 in association with the attribute data with the adjusted resolution.

For example, when, as shown in FIG. 16, the CPU 31 has performed interpolation to determine the attribute value at the CAD data point 11 located at a specific position by using four attribute data points 12, it reassigns identifiers, which uniquely identify the individual attribute data points 12, to each of the attribute data points 12 newly generated by interpolation. The CPU 31 then generates association information, such as that shown in FIG. 20, indicating the association between the attribute data points 12 before the adjustment of the resolution and those after the adjustment of the resolution.

When the CPU 31 has performed interpolation to select one attribute data point 12 to remain at every seven points and thin out the other attribute data points 12, it reassigns identifiers to each of the remaining attribute data points 12, and generates association information, as shown in FIG. 21, indicating the association between the attribute data points 12 before the adjustment of the resolution and those after the adjustment of the resolution.

This enables a user in a downstream process to obtain the distribution of the attributes values before the adjustment of the resolution, based on the data point 11 on which the attribute value after the adjustment of the resolution is superimposed, and compare these attribute values.

In addition to the adjusting of the resolution of CAD data and that of attribute data, as described above, the management apparatus 20 may superimpose attribute data indicating processed attribute values on CAD data so as to facilitate a search for integrated data 4 to be conducted in a downstream process.

To extract a feature from a product and generate feature extraction data, the CPU 31 extracts a region which matches a certain feature of the product from a two-valued distribution which indicates whether CAD data is present or absent, at a sampling interval in a three-dimensional space.

However, it may also be desirable to extract a feature from an attribute of a product expressed by a three- or greater multi-valued attribute value or a continuous value, such as data concerning the strength of a product.

In this case, the CPU 31 may convert attribute data expressed by a three- or greater multi-valued attribute value or a continuous value (hereinafter such attribute data will be called multi-valued attribute data) into that represented by a two-valued attribute value by using a threshold specified by a user. More specifically, if the attribute value is greater than or equal to the threshold, it is set to be "1", and if the attribute value is smaller than the threshold, it is set to be "0". In this case, the attribute value is converted into a two-valued attribute value at each attribute data point 12. The CPU 31 may then superimpose the conversion results on CAD data as new attribute data. As a result of converting the attribute value of multi-valued attribute data into two-valued attribute data, the CPU 31 can utilize an algorithm for extracting a feature from a product and generating feature extraction data.

Regarding attribute data concerning a specific attribute type, an attribute value may be binarized with plural thresholds. In this case, multiple new items of attribute data binarized by using the individual thresholds are superimposed on CAD data.

The CPU 31 completes the management processing shown in FIG. 10.

Figure 22:
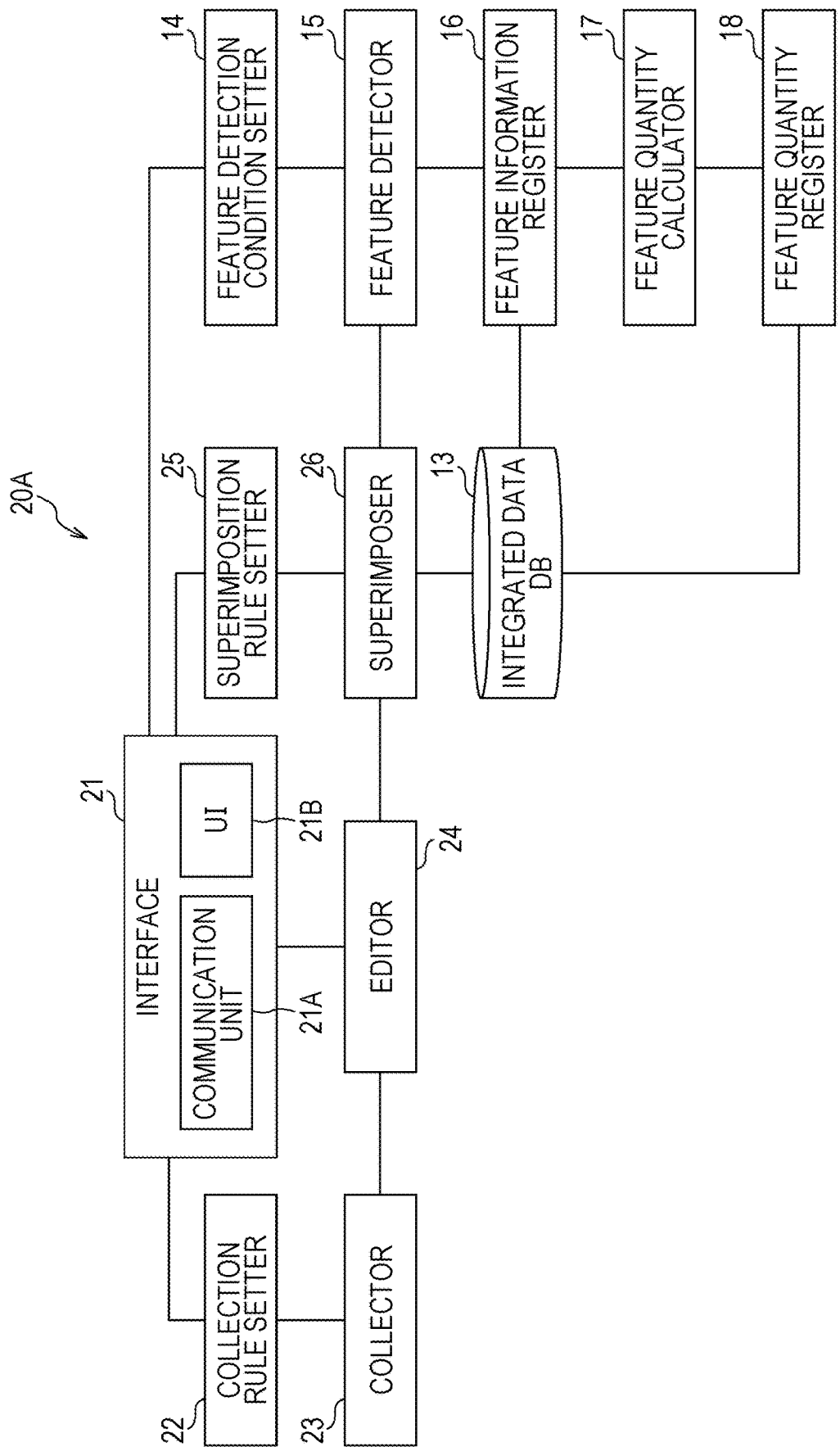
FIG. 22 is a block diagram illustrating another example of the functional configuration of the integrator.

A modified example of the functional configuration of the integrator 20A shown in FIG. 8 is shown in FIG. 22. The functional configuration of the integrator 20A in FIG. 22 is different from that in FIG. 8 in that it also includes a feature detection condition setter 14, a feature detector 15, a feature information register 16, and a feature quantity calculator 17, and a feature quantity register 18.

The feature detection condition setter 14 sets a feature detection condition, which is an example of a specifying condition for specifying a certain portion of a product, in accordance with information indicating a feature of the shape of the product received from a user via the interface 21.

The information indicating a feature of the shape of the product is information from which a certain portion of the product can be specified by the shape of part of the product or by work processing performed on the product. Examples of the information indicating a feature of the shape of the product are detailed shape attributes, such as the snap-fit 5, the keyway groove 6, the D-shaped cut face 7, and the retaining ring groove 8, postprocessing information on the product, such as punching, tapping, chamfering, polishing, and plating, and specific working information indicating specific working using a spring or a gear, for example, which is not expressed by CAD data.

In the feature detection condition, the content of processing to be performed on a portion of the product that satisfies the feature detection condition can also be set. For example, if a user wishes to record the shape and the attributes of a portion of the product that satisfies the feature detection condition in detail, the user can set, as the content of processing, a request to create CAD data expressed by higher resolution than that of CAD data already managed in integrated data 4 or a request to analyze this portion by making the resolution of attribute data concerning this portion be higher than that concerning the other portions.

The feature detector 15 detects a portion of the product that satisfies the feature detection condition set by the feature detection condition setter 14 by referring to CAD data on the product. The feature detector 15 then executes processing indicated by the feature detection condition on the detected portion of the product and generates feature information concerning the portion of the product specified by the feature detection condition. CAD data and attributes, such as detailed shape attributes, indicating a portion of the product specified by the feature detection condition are examples of feature information.

The feature information register 16 registers the feature information generated by the feature detector 15 in the integrated data 4 concerning this product by superimposing the feature information on the CAD data included in the integrated data 4.

The feature quantity calculator 17 calculates a feature quantity of the portion of the product specified by the feature detection condition so that a search for a product can be conducted by using a feature quantity of this product. A search by using a feature quantity will be discussed later. A feature quantity of a product is a physical property from which a feature of a product can be searched for, and is expressed by at least one of a scalar value and a vector value. For example, if CAD data regarding a product is constituted by voxels, an area histogram or the area change rate is a feature quantity when the surface for one layer of voxels is assumed as an image.

If the features of a product are expressed by feature quantities, a user can check the feature quantities of the shape rather than the shape itself so as to search for integrated data 4 to be used as a reference.

The feature quantity register 18 registers the feature quantity calculated by the feature quantity calculator 17 by superimposing the feature quantity on the CAD data concerning the product.

Figure 23:
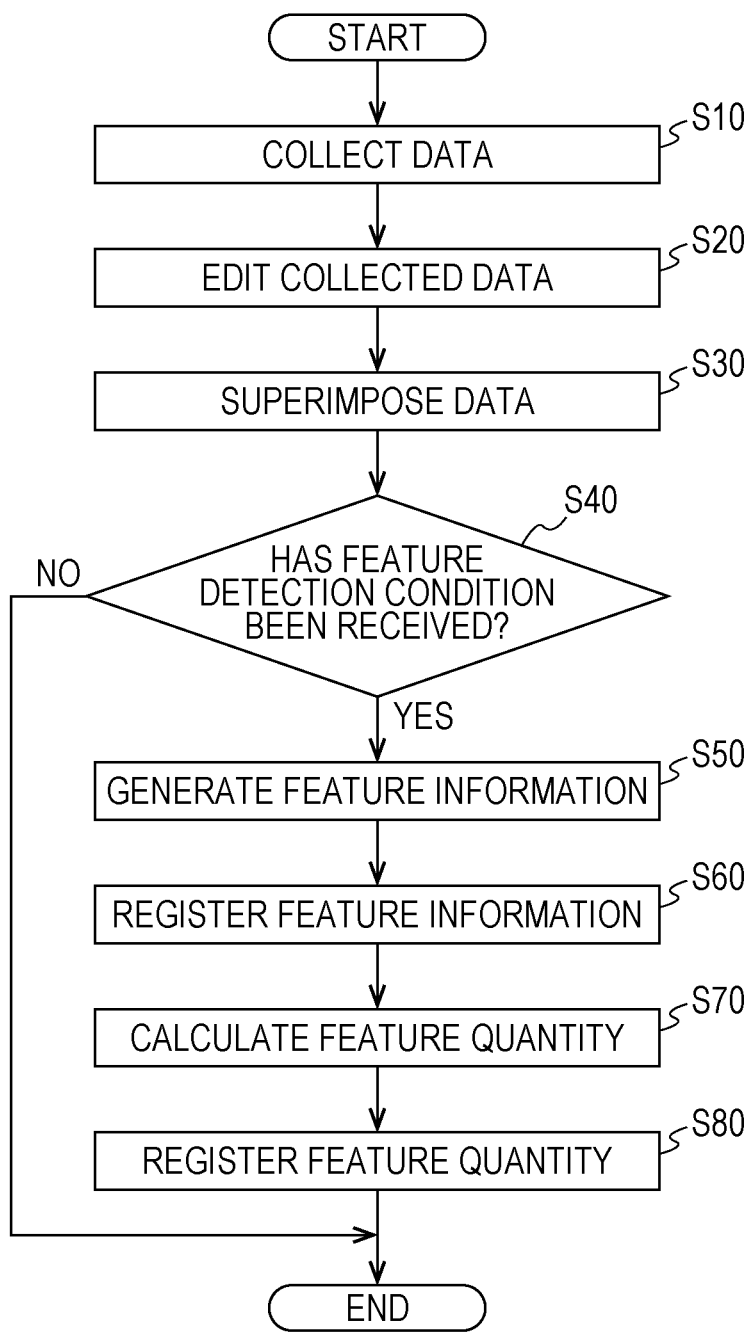
FIG. 23 is a flowchart illustrating an example of a procedure of management processing.

FIG. 23 is a flowchart illustrating a procedure of management processing executed by the CPU 31 of the management apparatus 20 based on the functional configuration of the integrator 20A shown in FIG. 22.

The management program which defines this management processing has been stored in the ROM 32 of the management apparatus 20, for example. The CPU 31 reads the management program stored in the ROM 32 and executes the management processing.

The management processing shown in FIG. 23 is different from that in FIG. 10 in that it includes steps S40 through S80, in addition to steps S10 through S30, which are the same as those in FIG. 10. Steps S40 through S80 will be discussed below.

After integrated data 4 is generated as a result of superimposing attribute data on each item of CAD data in step S30, step S40 is started.

In step S40, the CPU 31 judges whether a feature detection condition is received from a user. If a feature detection condition has not been received, the CPU 31 terminates the management processing in FIG. 23. If a feature detection condition is received, the CPU 31 proceeds to step S50.

In step S50, the CPU 31 refers to the CAD data concerning the product for which the integrated data 4 is generated in step S30, and detects a portion that satisfies the feature detection condition based on the shape of the product.

The CPU 31 then executes processing indicated in the feature detection condition on the detected portion.

For example, if increasing the resolution of CAD data is specified as the content of processing, the CPU 31 causes the user device 10 having a design tool to redesign CAD data by making the resolution of the detected portion be higher than that of the other portions, and then collects the redesigned CAD data from the user device 10. If the management apparatus 20 has a design tool, the CPU 31 may generate CAD data in the management apparatus 20 in accordance with the content of processing.

If increasing the resolution of attribute data is specified as the content of processing, the CPU 31 causes the user device 10 having a design tool to regenerate analysis data by making the resolution of the attribute data concerning the detected portion be higher than the other portions, and then collects the regenerated analysis data from the user device 10. If the management apparatus 20 has an analysis tool, the CPU 31 may generate analysis data in the management apparatus 20 in accordance with the content of processing.

If the CPU 31 has collected or generated analysis data in which the resolution of the attribute data concerning the portion detected in step S50 is higher than that of the other portions, the CPU 31 may collect or generate CAD data indicating the shape of the portion detected in step S50 and having the same level of resolution as that of the higher-resolution attribute data. The CPU 31 may then reconfigure the CAD data with voxels and superimpose the attribute values of the higher-resolution attribute data on the individual voxels.

If refinement of attributes is specified as the content of processing, the CPU 31 increases the number of attribute types to be superimposed on the portion that satisfies the feature detection condition to be greater than that of the other portions, thereby making the attributes of this portion in greater details.

For example, if the shape of the portion specified by the feature detection condition is the shape without PMI, such as the snap-fit 5, the keyway groove 6, the D-shaped cut face 7, or the retaining ring groove 8, the CPU 31 superimposes information indicating the presence or the absence of such a detailed shape and the number thereof on CAD data as an detailed shape attribute.

Depending on the orientation of a product indicated by CAD data, it may be difficult to detect a portion of the product having a feature indicated by the feature detection condition. In this case, the CPU 31 may rotate the CAD data to detect a portion having a feature similar to that indicated by the feature detection condition.

For example, if the portion of the product specified by the feature detection condition is a snap-fit 5, the CPU 31 detects a portion where an excessive overhang is attached to the tip of a wobbling portion is a snap-fit 5. However, the detecting of a wobble of a snap-fit 5 is influenced by the orientation of the snap-fit 5. For example, it is difficult to detect a wobble from CAD data indicating the product disposed in the orientation shown in FIG. 5. The CPU 31 thus rotates the CAD data to detect a portion having a feature similar to that indicated by the feature detection condition. The CPU 31 then generates feature information indicating the presence or the absence of a snap-fit 5 and the number thereof.

If the portion of the product specified by the feature detection condition is a D-shaped cut face 7, the CPU 31 detects a flat portion on part of a cylindrical surface as the D-shaped cut face 7.

If the portion of the product specified by the feature detection condition is a keyway groove 6, the CPU 31 detects a portion with a hole, such as an oval hole or a square hole, on part of a cylindrical surface as the keyway groove 6.

If the portion of the product specified by the feature detection condition is a retaining ring groove 8, the CPU 31 detects a portion having a different level in the axial direction on a cylindrical surface as the retaining ring groove 8.

To detect a cylindrical surface, a known detection technique, such as the fitting of a cylinder using the Hough transform, may be used.

If the portion of the product specified by the feature detection condition is described in the form of postprocessing information or specific working information, the CPU 31 extracts the corresponding information from the PMI or product drawing data and superimposes it on CAD data as attribute data concerning the portion that satisfies the feature detection condition.

In step S60 in FIG. 23, the CPU 31 registers the feature information concerning the portion detected in step S50 in the integrated data 4 by superimposing the feature information on the CAD data.

In step S70, the CPU 31 calculates a feature quantity of the portion of the product specified by the feature detection condition. In this case, the CPU 31 calculates the feature quantity only for the portion of the product specified by the feature detection condition. This makes it possible to generate the feature quantity regarding the number of portions having a shape specified by the feature detection condition and the positional relationship thereof.

In the above-described example, the CPU 31 calculates the feature quantity only for the portion of the product specified by the feature detection condition. However, the CPU 31 calculates feature quantities for the entire CAD data or for the entire attribute data included in the integrated data 4.

The CPU 31 may calculate, as the feature quantity, the volume (or the number of voxels) of a portion of the product in which a stress exceeds a predetermined threshold. The CPU 31 may also calculate feature quantities for multiple items of CAD data expressed by different levels of resolution. This makes it possible to conduct a search sequentially by using multiple items of CAD data based on the feature quantities. For example, a search using CAD data with low resolution is first conducted, and then, a search using CAD data with higher resolution is conducted.

As the resolution of CAD data or attribute data becomes higher, the number of CAD data points 11 or attribute data points 12 by unit volume is increased, and the time taken to calculate a feature quantity accordingly becomes longer. Hence, for CAD data or attribute data with resolution lower than a reference resolution value, the CPU 31 may calculate feature quantities for the entire product, while, for CAD data or attribute data with resolution higher than the reference resolution value, the CPU 31 may calculate feature quantities of only some portions of the product.

A database associating the calculated feature quantities and the identification (ID) numbers of the corresponding products may be created. By using this database, the CPU 31 can conduct a search for the ID number of a product having a feature quantity similar to that input by the user. With this search method, it takes less time to conduct a search than when the CPU 31 sequentially accesses multiple items of integrated data 4 to search for a product having a feature quantity similar to that input by the user.

In step S80, the CPU 31 registers the feature quantity calculated in step S70 in the integrated data 4 by superimposing the feature quantity on the corresponding CAD data. The CPU 31 then completes the management processing in FIG. 23.

Processing executed by the searcher 20B of the management apparatus 20 shown in FIG. 7 will be described below.

As described above, in the integrated data 4, attribute data concerning a product having a certain shape generated by using various engineering conditions, such as design conditions, analysis conditions, and manufacturing conditions, are centrally managed. The management apparatus 20 is thus able to output shape data and attribute data concerning a product which may be used as a reference for a user in a downstream process or a user assigned to designing or manufacturing of a new product. In this case, the management apparatus 20 is able to output the shape data and attribute data in the output mode desired by the user.

Figure 24:
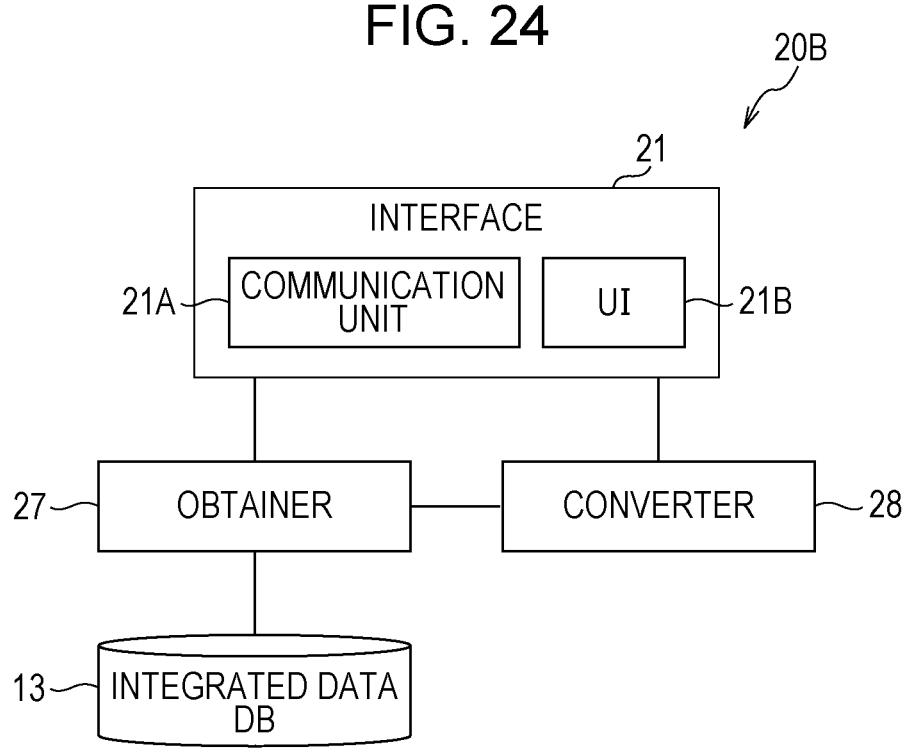
FIG. 24 is a block diagram illustrating an example of the functional configuration of a searcher.

FIG. 24 is a block diagram illustrating an example of the functional configuration of the searcher 20B. As shown in FIG. 24, the searcher 20B includes an interface 21, an obtainer 27, a converter 28, and an integrated data DB 13. Among these elements, the interface 21 and the integrated data DB 13 are those of the integrator 20A shown in FIG. 8. That is, as a result of processing executed by the integrator 20A, multiple items of integrated data 4 concerning multiple products are stored in the integrated data DB 13.

The obtainer 27 searches the integrated data DB 13 for integrated data 4 which satisfies a search condition input by a user. A user may input a search condition by operating the UI 21B of the management apparatus 20 or by using the user device 10 via the communication unit 21A.

In response to a request from a user, the converter 28 converts at least one of CAD data and attributes values of attribute data superimposed on the CAD data included in the integrated data 4 obtained by the obtainer 27, and outputs the converted CAD data and/or the converted attribute values. An instruction indicating how to convert data is sent to the converter 28 from the interface 21 as an output request.

"Output" in the exemplary embodiment may be any one of the following output modes: displaying data on the UI unit 38 as an image; printing data on a recording medium, such as paper; sending data to a user device 10 or an external device; and storing data in a storage.

Figure 25:
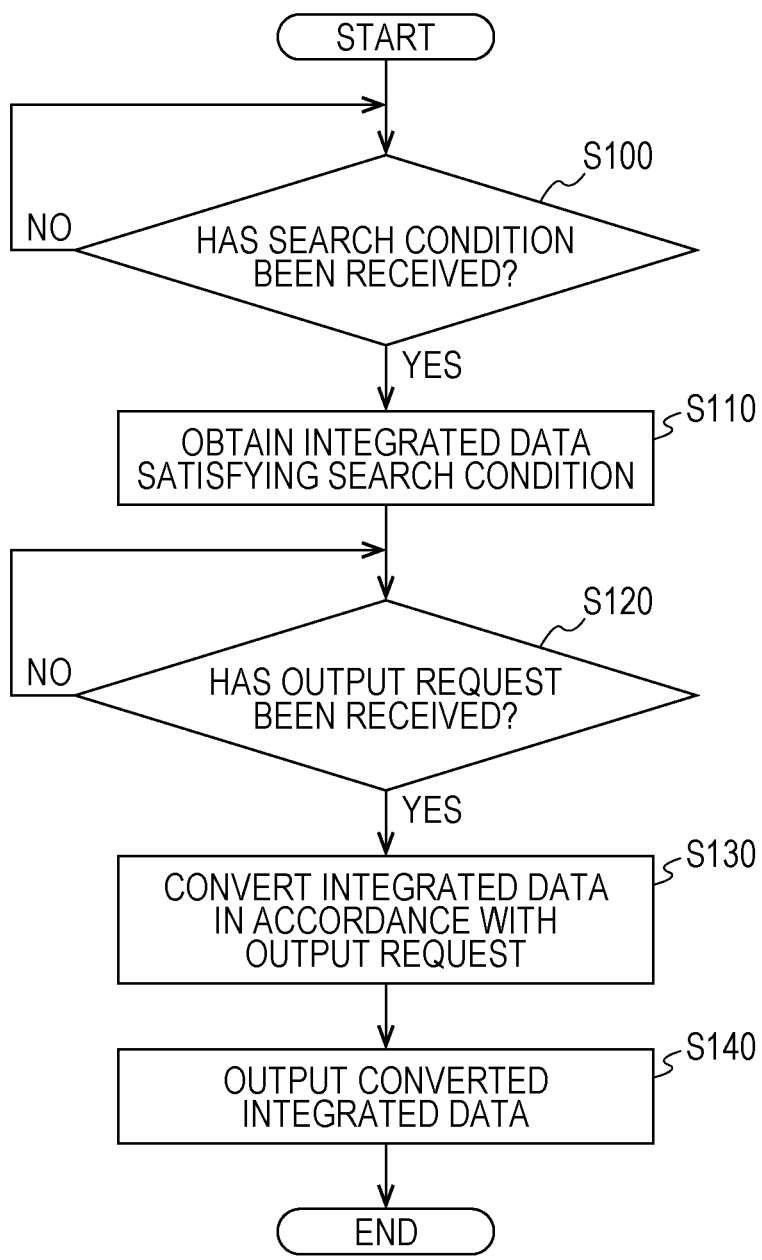
FIG. 25 is a flowchart illustrating an example of a procedure of search processing.

FIG. 25 is a flowchart illustrating an example of a procedure of search processing executed by the CPU 31 of the management apparatus 20 in response to an instruction to start a search from a user.

The management program which defines this search processing has been stored in the ROM 32 of the management apparatus 20, for example. The CPU 31 reads the management program stored in the ROM 32 and executes the search processing.

In step S100, the CPU 31 judges whether a search condition for searching for integrated data 4 is received from a user.

The content of the search condition is not restricted to a particular type or purpose. The search condition concerns at least one of the name or the ID number of a specific product, an attribute type and a range of attribute values of attribute data, the name of a user to search for integrated data 4 concerning a product handled by this user, a time period to search for integrated data 4 registered in the integrated data DB 13 during this time period, and the name of a process stage or a department to search for integrated data 4 concerning a product handled in this process stage or by this department. A user may also specify as the search condition whether, among items of attribute data concerning a product that satisfy the search condition, only representative attribute data or only attribute data other than the representative attribute data will be searched for.

Plural search conditions may be set. In this case, the numbers indicating a search order, such as the first search condition, the second search condition, . . . , the N-th search condition (N is a positive integer), are set.

If it is found that a search condition has not been received, the CPU 31 repeatedly executes step S100 and monitors input of a search condition from a user. If a search condition is received, the CPU 31 proceeds to step S110.

In step S110, the CPU 31 searches the integrated data DB 13 for integrated data 4 which satisfies the search condition received in step S100.

If multiple search conditions are set, the CPU 31 conducts a refine search sequentially by using the individual search conditions to narrow down the results.

Narrowing down of the search results by using multiple search conditions will be described below by taking the following specific example. A user is now developing a new product by using integrated data 4 concerning a past product as a reference.

Figures 26, 27:
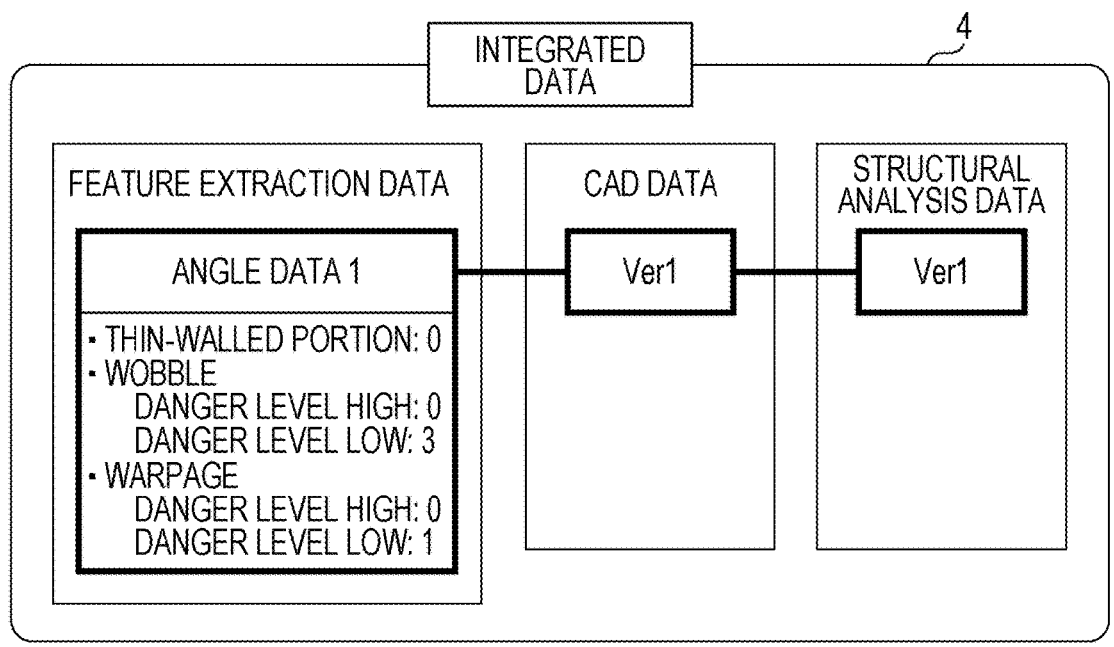
FIG. 26 illustrates an example of integrated data concerning a product that is being developed.
FIG. 27 illustrates examples of search conditions.

FIG. 26 illustrates an example of integrated data 4 concerning a product that the user is developing. The integrated data 4 includes CAD data Ver1, which is the initial version of the shape of the product. The integrated data 4 also includes structural analysis data Ver1, which is the structural analysis result for CAD data Ver1, and feature extraction data concerning features to be extracted if this product is created with a 3D printer. Structural analysis data Ver1 and feature extraction data are superimposed on CAD data Ver1.

The user is now making a decision as to whether injection molding or a 3D printer will be utilized to manufacture the developing product and wishes to check whether a past product similar to this developing product has been manufactured by injection molding or with a 3D printer. Then, the user sets search conditions. The search conditions each specify a range of attribute values of each of the shape of the product, structural analysis data, and feature extraction data that is likely to indicate a product similar to the developing product.

FIG. 27 illustrates examples of the search conditions set by this user. As the first search condition, a search condition is set to search for integrated data 4 including CAD data whose representative attribute data shows that the similarity of the shape of the product with respect to the developing product is 60% or higher. As the second search condition, a search condition is set to search for integrated data 4 including structural analysis data showing that the maximum displacement in response to a stress is ±1 mm or greater. As the third condition, a search condition is set to search for integrated data 4 including feature extraction data showing that portions having a high danger level of wobble or warpage are zero. Among the first, second, and third conditions, the first condition is the major condition.

Upon receiving the search conditions shown in FIG. 27, the CPU 31 first searches the integrated data DB 13 for items of integrated data 4 including an attribute value of attribute data that matches the first search condition. The CPU 31 then judges for each item of integrated data 4 that matches the first search condition whether the attribute value of the attribute data specified by the second search condition matches the second search condition. The CPU 31 then judges for each item of integrated data 4 that matches the first search condition whether the attribute value of the attribute data specified by the third search condition matches the third search condition. The CPU 31 then divides the items of attribute data 4 obtained as a result of the above-described search into a group that matches only one of the three search conditions, a group that matches two of the three search conditions, and a group that matches all the three search conditions. The CPU 31 outputs the divided groups as the search result.

In this manner, the CPU 31 first conducts a rough search to extract integrated data 4 indicating a product having a shape similar to the developing product from the integrated data DB 13 while disregarding the attributes of the product. The CPU 31 then narrows down the search results by using the attribute value of the structural analysis data, and then further narrows down the search results in terms of a request for the feature extraction data set as the third search condition.

FIG. 28 is a table illustrating an example of the search result of integrated data 4 based on the search conditions shown in FIG. 27. The integrated data IDs "05", "23", and "16" indicate the items of integrated data 4 that match all the three search conditions. The integrated data IDs "04", "03", and "11" indicate the items of integrated data 4 that match two of the three search conditions. The integrated data ID "09" indicates the item of integrated data 4 that matches one of the three search conditions.

If the CPU 31 searches the integrated data DB 13 for the results of logical AND of the first, second, and third conditions shown in FIG. 27, that is, the items of integrated data 4 that match all the three conditions, only the items of integrated data 4 having IDs "05", "23", and "16" are output. However, integrated data 4 that matches only the first and third search conditions may include information that can be used by the user developing the new product as a reference. It is thus desirable that the CPU 31 obtain integrated data 4 that matches the first search condition even if it does not match at least one of the other search conditions.

On the other hand, however, if the CPU 31 searches the integrated data DB 13 for the results of logical OR of the first, second, and third conditions shown in FIG. 27, that is, the items of integrated data 4 that match at least any one of the three conditions, integrated data 4 including CAD data whose representative attribute data shows that the similarity of the shape is lower than 60% is also output if it matches at least one of the second and third search conditions. Such integrated data 4 is less likely to be useful for the user because the overall shape is not similar to the developing product. For example, if the user is designing the housing of a printer, integrated data 4 indicating the shape of a ballpoint pen is not useful. It is thus desirable that the CPU 31 first conduct a rough search to exclude integrated data 4 that does not match the first search condition.

Instead of sequentially applying search conditions, the CPU 31 may sequentially change the search object to search for integrated data 4. For example, it is assumed that, from among multiple items of integrated data 4, each including multiple items of CAD data expressed by different levels of resolution, the CPU 31 searches for CAD data indicating a product similar to a specified shape. In this case, if CAD data with the highest resolution is first used to determine how much the shape of the product indicated by this CAD data is similar to the specified shape, it takes a lot of time because the density of each item of data is high. The CPU 31 thus first uses CAD data with the lowest resolution to determine whether the shape of the product indicated by this CAD data is similar to the specified shape. If the shape of this product is found to be similar to the specified shape, the CPU 31 uses CAD data with a next higher level of resolution concerning this product. In this manner, the CPU 31 uses items of CAD data with different levels of resolution in ascending order of resolution. Only when the shapes of the product indicated by the items of CAD data with the lowest to the second highest levels of resolution are found to be similar to the specified shape, does the CPU 31 uses the CAD data with the highest level of resolution to make the above-described determination.

As a result of sequentially changing the search object as described above, the time taken to conduct a search can be reduced, compared with when CAD data with the highest level of resolution is first used.

Integrated data 4, which is a search target, may not always include an attribute specified by a search condition. The following situation may be considered. As a result of conducting a search in accordance with the search conditions shown in FIG. 27, integrated data 4 which matches the first and third search conditions is found. For this integrated data 4, the second search condition is undeterminable because the CAD data has not been subjected to structural analysis due to a problem concerning the shape of the product. As a result, attribute data concerning the stress displacement of this product is not superimposed on the CAD data.

For this type of integrated data 4, the second search condition is undeterminable. Hence, it is not desirable that the CPU 31 count this integrated data 4 as integrated data 4 that matches a search condition, unlike the integrated data ID "09" shown in FIG. 28 that matches the first condition.

Even in this case, however, another version of CAD data may be included in this integrated data 4. Structural analysis may have been conducted on this version of CAD data, and attribute data concerning the stress displacement of the product may be superimposed on this version of CAD data. Such information may be useful for the user developing the new product as a reference.

Thus, if the attribute type specified by at least one of the second and subsequent search conditions is not superimposed on CAD data of integrated data 4 which matches the first search condition, the CPU 31 outputs such integrated data 4, not as integrated data 4 that matches the first search condition, but as reference information.

FIG. 29 is a table illustrating an example of the search result of items of integrated data 4 which are output as reference information. For the integrated data ID "12", structural analysis data is not superimposed on the CAD data which matches the first search condition. For the integrated data IDs "29" and "08", feature extraction data is not superimposed on the CAD data which matches the first search condition. Accordingly, these items of integrated data are output as reference information, separately from the search result shown in FIG. 28.

It is assumed that, for another version of CAD data of the integrated data ID "12", which is ultimately selected for manufacturing the product, the maximum displacement of the product in response to a stress is 1 mm or smaller. In this case, if the user refers to this version of CAD data, it can acquire knowledge about the shape of the product that can reduce the maximum displacement to 1 mm or smaller.

In step S120 of FIG. 25, the CPU 31 judges whether an output request has been received. The output request is a request which defines how the CAD data and attribute data of the integrated data 4 obtained in step S110 (such integrated data 4 will be called obtained integrated data 4) will be converted and output.

If an output request has not been received, the CPU 31 repeatedly executes step S120 and monitors the receiving of an output request. If an output request is received, the CPU 31 proceeds to step S130. Instead of separately receiving a search condition and an output request, the CPU 31 may receive a search condition and an output request together in step S100.

In step S130, the CPU 31 converts the obtained integrated data 4 in accordance with the content of the output request.

If the output request is a request to output the obtained integrated data 4 in the format suitable for doing work by the user, such as for developing a product by using the obtained integrated data 4 as a reference or for making various types of analysis on CAD data designed in an upstream process and extracted from the obtained integrated data 4, the CPU 31 converts the obtained integrated data 4 into a format suitable for the content of work to be done by the user.

More specifically, if the user uses the obtained integrated data 4 merely to check the overall shape of the product or the overall attributes, the user does not require high-resolution data. On the contrary, high-resolution data requires a lot of time to output, which lowers the work efficiency for the user. In this case, the CPU 31 may thin out data points until the resolution of the data reaches a predetermined level and output the data with a reduced amount. This type of processing is called level of detail (LOD) processing.

If the user uses the obtained integrated data 4 merely to check the contours of the product and when the CAD data of the obtained integrated data 4 is constituted by voxels, the CPU 31 may reconfigure the shape of the product indicated by the CAD data as a combination of polygons having a triangular shape, for example, and superimpose the corresponding attribute data on each polygon. The CPU 31 may alternatively convert the shape of the product expressed by the polygons into that by surface modeling data. The CPU 31 may also execute volume rendering on data, such as a three-dimensional distribution of numeric values of analysis results or measurement results, which are unable to be represented by surface modeling, so that such data can be superimposed on CAD data or surface modeling data.

To express the shape of the product, instead of outputting attribute data superimposed on CAD data of the obtained integrated data 4 as the numeric values, the CPU 31 may provide different colors to the corresponding portions of the product in accordance with the magnitude of the attribute value of attribute data. In this case, the number of attributes to be used is not limited. For example, if multiple attributes are specified, the CPU 31 executes calculation by using the attribute values of the multiple attributes superimposed on the same portion of the product and sets the calculated numeric value as a new attribute value. Then, the CPU 31 provides different colors to the portions of the product in accordance with the magnitude of the new attribute value. In this case, the calculation content for generating a new attribute value from the attribute values of the multiple attributes is not restricted.

It can be assumed that the user is interested in the content set as the search conditions. For example, the user has set the condition that the maximum displacement in response to a stress is ±1 mm or greater as the second search condition in FIG. 27. From this content, it is highly likely that the user is not interested in the portions where the maximum displacement is less than ±1 mm. The CPU 31 may thus clip or filter the portions of products or their attribute values that do not satisfy the search condition before outputting the data.

Alternatively, the CPU 31 may output the portions of products and their attribute values that match a search condition, separately from those that do not match the search condition.

When outputting multiple items of obtained attribute data 4, the CPU 31 may normalize the attribute values of attribute data and then superimpose them on the corresponding items of CAD data so that a user can easily compare the attribute values with each other.

The CPU 31 refers to a processing table which defines the content of user work and the content of conversion processing to be executed by the management apparatus 20. The CPU 31 then converts data that matches a search condition into a format suitable for the content of user work, and then associates the attribute values of the converted attribute data with the converted CAD data.

If the output request is not a request to output the obtained integrated data 4 in the format suitable for doing work by a user, but in the format suitable to be used by a user device 10 that autonomously do work in response to inputting of data, the CPU 31 converts the obtained integrated data 4 into a format suitable for the content of work to be done by the user terminal 10.

For example, a certain user terminal 10 autonomously calculates the amount of material to be used for manufacturing a product in response to inputting of the dimensions and the volume of the product, thereby estimating the manufacturing cost of the product. In this case, in response to an instruction for the user device 10 to estimate the manufacturing cost from a user, the CPU 31 extracts the measurement data and the volume of the product from the integrated data 4 specified by the user among the obtained items of integrated data 4, and sends them to the user device 10. This enables the user device 10 to automatically calculate the manufacturing cost without the intervention of the user.

In this manner, extracting only CAD data or attribute data concerning a specific attribute type to be used by a user device 10 from specified integrated data 4 is also an example of data conversion for converting the integrated data 4 into a data format in accordance with the content of work to be done by the user device 10.

The attribute types and the resolution of a product to be required in each process stage, such as a designing stage, an analyzing stage, and a manufacturing stage, are fixed. The display mode of the shape of a product and attribute data are also fixed. For example, in the analyzing stage of conducting structural analysis, CAD data to be analyzed is required, and the range of resolution suitable for structural analysis may be fixed. In the designing stage and the manufacturing stage, expertise in designing and that in manufacturing are required. It is thus unlikely that one user is assigned to multiple stages.

Hence, the CPU 31 may extract user attributes indicating personal information and classification information concerning the user having input a search condition, such as the name and the department of the user, and the name of the process stage and the name of the product assigned to the user. The CPU 31 may then determine from the user attributes the attribute type and resolution data required for the user and determine the type of conversion required for the user even without receiving an output request from the user. The CPU 31 may then extract the attribute type and attribute data from the obtained integrated data 4, convert the attribute values, and output the conversion results.

Even for attribute data concerning an attribute type required by a user, the user may not need all the attribute values of this attribute type and require attribute values only included in a predetermined range, depending on the process stage assigned to the user. In this situation, the CPU 31 may output attribute values only included in the predetermined range in accordance with the user attributes.

A user table is provided in which user attributes concerning a user are associated with the attribute type, resolution, the conversion content of attribute values of attribute data, and a range of the attribute values required by this user. The user table is stored in the non-volatile memory 34, for example.

In step S140 of FIG. 25, the CPU 31 outputs the content of the integrated data 4 converted in step S130 and completes the search processing shown in FIG. 25.

FIG. 30 is a table illustrating an output example of the search result of integrated data 4 shown in FIG. 28 obtained based on the search conditions shown in FIG. 27. FIG. 31 is a table illustrating an output example of the reference information shown in FIG. 29 obtained based on the search conditions shown in FIG. 27. FIGS. 30 and 31 illustrate examples of the search result and reference information displayed on the UI unit 38.

In the display examples in FIGS. 30 and 31, the items of integrated data 4 are sorted and are distinguished from each other by color in accordance with the number of conditions among the first, second, and third search conditions shown in FIG. 27 that match the corresponding items of integrated data 4. The CPU 31 may display the items of integrated data 4 by distinguishing the attribute values that satisfy a corresponding search condition and those that do not satisfy a corresponding search condition from each other, as shown in FIG. 32.

The disclosure has been described above through illustration of the above-described exemplary embodiment. However, the disclosure is not restricted to the above-described exemplary embodiment. Various modifications and/or improvements may be made to the exemplary embodiment without departing from the spirit and scope of the disclosure. Exemplary embodiments obtained by making modifications and/or improvements are also encompassed within the scope of the disclosure. For example, the order of operations may be changed without departing from the spirit and scope of the disclosure.

In the above-described exemplary embodiment, processing operations are implemented by software by way of example. However, operations equivalent to those in the flowcharts of FIGS. 10, 23, and 25 may be implemented by using hardware, such as an application specific integrated circuit (ASIC), a field programmable gate array (FPGA), or a programmable logic device (PLD). In this case, the processing operations are executed faster than using software.

In this manner, the CPU 31, which is an example of a general processor, may be replaced by a processor dedicated to specific processing, such as an ASIC, an FPGA, a PLD, a graphics processing unit (GPU), or a floating point unit (FPU).

In the embodiment above, the term "processor" is broad enough to encompass one processor or plural processors in collaboration which are located physically apart from each other but may work cooperatively. The order of operations of the processor is not limited to one described in the embodiment above, and may be changed.

Although the management program is installed in the ROM 32 in the above-described exemplary embodiment, it may be provided in a different manner. For example, the management program may be provided as a result of being recorded in a computer-readable storage medium, such as an optical disc (a compact disc (CD)-ROM or a digital versatile disc (DVD)-ROM), or in a portable semiconductor memory, such as a universal serial bus (USB) memory and a memory card.

The management apparatus 20 may obtain via the communication unit 37 the management program according to an exemplary embodiment of the disclosure from an external device connected to the communication network 2.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A management apparatus comprising:
   a processor configured to
   autonomously collect, even without an instruction from a user, attribute data concerning attributes of a product defined by a three-dimensional shape, in accordance with a collection rule for collecting the attribute data concerning the product, the attribute data being generated in individual process stages before the product is manufactured,
   associate the collected attribute data with three-dimensional shape data indicating the three-dimensional shape of the product, as the attributes of the three-dimensional shape data, in accordance with a superimposition rule which defines association between the three-dimensional shape data and the attribute data concerning the product, the superimposition rule indicating a manner in which the attribute data concerning the product is combined into the three-dimensional shape data using at least one of best-fit matching, bounding-box matching, center matching, and centroid matching, and manage the three-dimensional shape data and the attributes of the product.

2. The management apparatus according to claim 1, wherein, among the attributes to be associated with the three-dimensional shape data, if two or more items of attribute data are collected for an identical attribute type, the processor is configured to:

specify, for each attribute type for which two or more items of attribute data are collected, an item of attribute data which represents a corresponding attribute type, as representative attribute data concerning the product; and manage the three-dimensional shape data and the attributes of the product as a result of associating at least the representative attribute data concerning each attribute type of the product with the three-dimensional shape data and integrating at least the representative attribute data and the three-dimensional shape data associated with each other as integrated data.

3. The management apparatus according to claim 1, wherein the collection rule is set in accordance with a flow of work in each of the individual process stages.

4. The management apparatus according to claim 1, wherein the processor is configured to:

collect attribute data concerning the product, the attribute data having been generated when the product has been designed with an additional condition different from a condition considered by a user.

5. The management apparatus according to claim 1, wherein:

for each attribute type for which two or more items of attribute data are collected, an item of attribute data which represents a corresponding attribute type is specified as representative attribute data concerning the product; and the item of attribute data selected as the representative attribute data satisfies more specifications of the product than the other one or more items of attribute data.

6. The management apparatus according to claim 1, wherein, if a portion of the product indicated by the three-dimensional shape data satisfies a predetermined specifying condition, the processor is configured to:

superimpose new attribute data concerning the product on the three-dimensional shape data at a position corresponding to the portion of the product.

7. The management apparatus according to claim 6, wherein the processor is configured to:

calculate a multi-dimensional feature quantity of the product from the three-dimensional shape data at the position corresponding to the portion of the product and from the new attribute data; and associate the calculated multi-dimensional feature quantity with the three-dimensional shape data concerning the product.

8. The management apparatus according to claim 1, wherein the processor is configured to:

convert the three-dimensional shape data concerning the product into three-dimensional shape data represented by a combination of a plurality of three-dimensional regions divided from the three-dimensional shape data concerning the product.

9. The management apparatus according to claim 8, wherein the processor is configured to:

define the three-dimensional shape data concerning the product with a required level of precision by changing resolution of the plurality of three-dimensional regions divided from the data concerning the product.

10. The management apparatus according to claim 1, wherein, if a portion of the product indicated by the three-dimensional shape data satisfies a predetermined specifying condition, the processor is configured to:

superimpose attribute data on the three-dimensional shape data concerning the product, the attribute data being generated as a result of making resolution of the portion of the product which satisfies the predetermined specifying condition be higher than a portion of the product which does not satisfy the predetermined specifying condition.

11. The management apparatus according to claim 1, wherein the processor is configured to:

collect items of three-dimensional shape data concerning the product expressed by a plurality of levels of resolution; and associate multi-dimensional feature quantities of the product calculated based on the items of three-dimensional shape data expressed by the plurality of levels of resolution with the corresponding items of three-dimensional shape data.

12. The management apparatus according to claim 1, wherein the superimposition rule defines association between the three-dimensional shape data and the attribute data concerning the product in a three-dimensional space in which the product is disposed.

13. The management apparatus according to claim 12, wherein the processor is configured to:

associate the attribute data concerning the product with the three-dimensional shape data concerning the product in accordance with the superimposition rule after processing attribute values of the attribute data.

14. The management apparatus according to claim 13, wherein, if the attribute data is expressed by a three- or greater multi-valued attribute value or a continuous attribute value, the processor is configured to:

convert the three- or greater-valued attribute value of the attribute data into a two-valued attribute value and then associates the attribute data with the three-dimensional shape data concerning the product.

15. The management apparatus according to claim 13, wherein the processor is configured to:

adjust resolution of the three-dimensional shape data to be associated with the attribute data concerning the product and adjust resolution of the attribute data generated based on the three-dimensional shape data from a first resolution level to a second resolution level.

16. The management apparatus according to claim 15, wherein the processor is configured to:

manage the attribute data expressed by the first resolution level, together with attribute data expressed by the second resolution level, as a result of including the attribute data expressed by the first resolution level and the attribute data expressed by the second resolution level in integrated data, the integrated data integrating attribute data and the three-dimensional shape data concerning the product associated with each other.

17. The management apparatus according to claim 4, wherein the processor is configured to:

generate three-dimensional shape data and attribute data concerning the product, based on each of the additional conditions, until a total number of the conditions reaches a predetermined number, processing for generating the three-dimensional shape data and the attribute data being started in accordance with a load of the processor.

18. A management apparatus comprising:

a processor configured to obtain integrated data which satisfies a search condition specified by a user from a storage, the storage storing items of integrated data, each of the items of integrated data being generated by integrating three-dimensional shape data indicating a three-dimensional shape of a product and attribute data concerning attributes of the product associated with each other in accordance with a superimposition rule indicating a manner in which the attribute data concerning the attributes of the product is combined into the three-dimensional shape data using at least one of best-fit matching, bounding-box matching, center matching, and centroid matching, and convert, in response to a request from the user, an attribute value of at least one item of attribute data concerning a product associated with three-dimensional shape data included in the obtained integrated data and output the obtained integrated data.

19. The management apparatus according to claim 18, wherein, if the request is a request to output an attribute of the product indicated by the obtained integrated data to be used for work to be conducted by the user using the obtained integrated data, the processor is configured to:

convert the attribute value of at least one item of attribute data concerning the product into a format suitable for the content of work to be conducted by the user and output the obtained integrated data.

20. The management apparatus according to claim 19, wherein, if the three-dimensional shape data concerning the product indicated by the obtained integrated data is constituted by a combination of a plurality of three-dimensional regions divided from the three-dimensional shape data, the processor is configured to:

convert the three-dimensional shape data concerning the product into three-dimensional shape data indicating a surface of the product configured by using at least one of a group of a plurality of plane surfaces or a group of a plurality of curved surfaces, associate the converted attribute value of at least one item of attribute data concerning the product with the converted three-dimensional shape data, and output the obtained integrated data.

21. The management apparatus according to claim 18, wherein, if the request is a request to output an attribute of the product indicated by the obtained integrated data to be used for work to be autonomously conducted by a device, the processor is configured to:

convert the attribute value of at least one item of attribute data concerning the product into a format suitable for the content of work to be conducted by the device and output the obtained integrated data.

22. The management apparatus according to claim 18, wherein the processor is configured to:

select attribute data to be obtained from the integrated data and determine the content of conversion of the attribute value of the selected attribute data, in accordance with a user attribute concerning the user having made the request.

23. The management apparatus according to claim 18, wherein, if at least one item of integrated data stored in the storage includes at least one of a group of a plurality of items of three-dimensional shape data expressed by different levels of resolution and a group of a plurality of items of attribute data expressed by different levels of resolution, the processor is configured to:

conduct a search sequentially by using the at least one of the group of the plurality of items of three-dimensional shape data and the group of the plurality of items of attribute data from rough resolution to more detailed resolution.

24. The management apparatus according to claim 18, wherein, if a plurality of search conditions are received, the processor is configured to:

obtain integrated data that matches a major search condition among the plurality of search conditions even if the integrated data does not match at least one of the other search conditions of the plurality of search conditions, a search being first conducted by using the major search condition among the plurality of search conditions.

25. The management apparatus according to claim 24, wherein, the processor is configured to:

output the integrated data that matches the major search condition as reference information if an attribute specified by at least one of the other search conditions is not associated with three-dimensional shape data included in the integrated data that matches the major search condition.

26. A non-transitory computer readable medium storing a program causing a computer to execute a process, the process comprising:

autonomously collecting, even without an instruction from a user, attribute data concerning attributes of a product defined by a three-dimensional shape, in accordance with a collection rule for collecting the attribute data concerning the product, the attribute data being generated in individual process stages before the product is manufactured;

associating the collected attribute data with three-dimensional shape data indicating the three-dimensional shape of the product, as attributes of the three-dimensional shape data, in accordance with a superimposition rule which defines association between the three-dimensional shape data and the attribute data concerning the product, the superimposition rule indicating a manner in which the attribute data concerning the product is combined into the three-dimensional shape data using at least one of best-fit matching, bounding-box matching, center matching, and centroid matching; and managing the three-dimensional shape data and the attributes of the product.

27. The management apparatus according to claim 2, wherein if two or more items of attribute data obtained from results of two or more different manufacturing conditions are collected for an identical attribute type, the processor is configured to specify, for each attribute type for which two or more items of attribute data are collected, an item of attribute data and a manufacturing condition corresponding to the specified item of attribute data which represents a corresponding attribute type, as representative attribute data concerning the product; and manage the three-dimensional shape data and the attributes of the product as a result of associating at least the representative attribute data concerning each attribute type of the product with the three-dimensional shape data and integrating at least the representative attribute data, the manufacturing condition and the three-dimensional shape data associated with each other as integrated data.

* * * * *